(12) United States Patent
Sengupta et al.

(10) Patent No.: US 12,106,222 B2
(45) Date of Patent: Oct. 1, 2024

(54) NEURAL NETWORK TRAINING UNDER MEMORY RESTRAINT

(71) Applicant: Amazon Technologies, Inc., Seattle, WA (US)

(72) Inventors: Sudipta Sengupta, Sammamish, WA (US); Randy Renfu Huang, Morgan Hill, CA (US); Ron Diamant, Santa Clara, CA (US); Vignesh Vivekraja, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/112,036

(22) Filed: Feb. 21, 2023

(65) Prior Publication Data

US 2023/0196113 A1    Jun. 22, 2023

Related U.S. Application Data

(62) Division of application No. 16/836,421, filed on Mar. 31, 2020, now Pat. No. 11,610,128.

(51) Int. Cl.
*G06N 3/084* (2023.01)
*G06N 3/04* (2023.01)

(52) U.S. Cl.
CPC ............. *G06N 3/084* (2013.01); *G06N 3/04* (2013.01)

(58) Field of Classification Search
CPC ................................ G06N 3/084; G05B 13/02
USPC ........................................ 707/695, 625, 692
See application file for complete search history.

(56) References Cited

U.S. PATENT DOCUMENTS

| | | | | |
|---|---|---|---|---|
| 11,429,862 | B2 * | 8/2022 | Chai ..................... | G06N 3/044 |
| 2018/0349772 | A1 * | 12/2018 | Tokui ..................... | G06N 3/044 |
| 2019/0138878 | A1 * | 5/2019 | Delong .................. | G16B 45/00 |
| 2019/0188569 | A1 | 6/2019 | Naumov | |
| 2019/0354846 | A1 * | 11/2019 | Mellempudi .......... | G06N 3/063 |
| 2021/0216866 | A1 * | 7/2021 | Ito ............................ | G06N 3/04 |
| 2022/0375033 | A1 * | 11/2022 | Suzuki ................ | G06N 3/0464 |
| 2022/0398431 | A1 * | 12/2022 | Tanaka ..................... | G06N 3/04 |

OTHER PUBLICATIONS

CN202110342087.0, "Office Action", Aug. 30, 2023, 6 pages.

* cited by examiner

*Primary Examiner* — Kiet M Doan
(74) *Attorney, Agent, or Firm* — Kilpatrick Townsend & Stockton LLP

(57) ABSTRACT

Methods and systems for training a neural network are provided. In one example, an apparatus comprises a memory that stores instructions; and a hardware processor configured to execute the instructions to: control a neural network processor to perform a loss gradient operation to generate data gradients; after the loss gradient operation completes, control the neural network processor to perform a forward propagation operation to generate intermediate outputs; control the neural network processor to perform a backward propagation operation based on the data gradients and the intermediate outputs to generate weight gradients; receive the weight gradients from the neural network processor; and update weights of a neural network based on the weight gradients.

20 Claims, 19 Drawing Sheets

| Layers | Forward propagation computation time | Intermediate output data size |
|---|---|---|
| 0 | Time-0 | Size-0 |
| 1 | Time-1 | Size-1 |
| 2 | Time-2 | Size-2 |
| ⋯ | ⋯ | ⋯ |
| n | Time-n | Size-n |

FIG. 7

NEURAL NETWORK TRAINING UNDER MEMORY RESTRAINT

CROSS REFERENCES TO RELATED APPLICATIONS

This application is a Divisional of U.S. non-provisional application Ser. No. 16/836,421, filed Mar. 31, 2020, and entitled "NEURAL NETWORK TRAINING UNDER MEMORY RESTRAINT", the content of which is herein incorporated by reference in its entirety.

BACKGROUND

Artificial neural networks are computing systems with an architecture based on biological neural networks. An artificial neural network can include a set of weights. Through computations, the weights can be combined with input data to extract information, and a decision can be made based on the information. For example, for a computer vision application to detect an object, the artificial neural network can combine the weights with an input image to extract certain features of the object from the image. Based on the extracted features, the artificial neural network can generate a decision of whether the object is in the image.

The set of weights of an artificial neural network can be generated/updated by a training process, in which the artificial neural network can learn about how to perform a certain computing task for an application. The training process involves supplying the artificial neural network with training input data, which can be labelled with a reference output set which supports a particular decision (e.g., a detection or a non-detection of an object in an image). The artificial neural network can perform computations to combine the weights with the training input data to generate a training output data set, and the training output data set can be compared against the reference output data set to generate a set of differences. During the training, different training input data sets can be provided to the artificial neural network to generate different training output data sets. The set of weights of the artificial neural network can be adjusted based on an objective such as, for example, minimizing the differences between the training output data sets and the reference output data sets.

To improve the likelihood of the artificial neural network generating a correct decision, typically a large volume of training input data covering a large number of operation scenarios is used to train an artificial neural network. As a result, a training operation typically requires a lot of resources, such as memory resources.

BRIEF DESCRIPTION OF THE DRAWINGS

Various embodiments in accordance with the present disclosure will be described with reference to the drawings, in which:

FIG. 7 illustrates an example of heuristic information used by the training module to control a training operation, according to certain aspects of the present disclosure;

DETAILED DESCRIPTION

Figure 1:
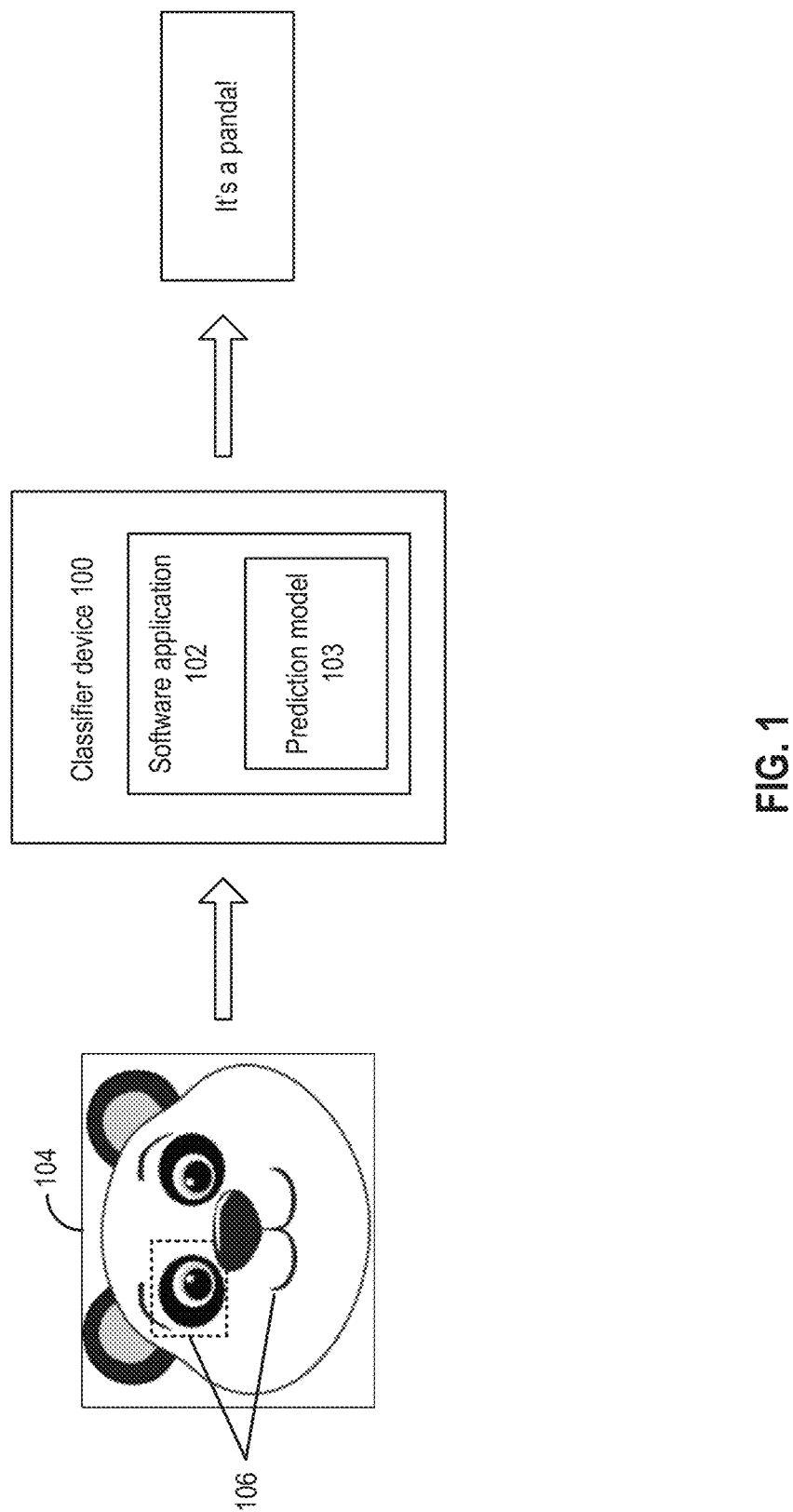
FIG. 1 illustrates an example a classifier device that uses techniques disclosed herein to process data.

Examples of the present disclosure relate to neural network processing, and more specifically, to performing a training process of a neural network in a distributed system.

An artificial neural network (hereinafter, neural network) is typically implemented in a computing system, such as a neural network processor, to have an architecture based on biological neural networks, and to process input data in an analogous fashion as biological neural networks. A neural network typically includes a number of cascading neural network layers, with each layer including a set of weights. In an inference operation, a first neural network layer can receive an input data set, combine the input data with first weights of the first neural network layer (e.g., by multiplying the input data set with the weights and then summing the products, post-processing the sum, etc.) to generate first intermediate outputs, and propagate the first intermediate outputs to a second neural network layer, in a first forward propagation operation. The second neural network layer performs a second forward propagation operation by combining the first intermediate outputs with second weights of the second neural network layer to generate second intermediate outputs, and propagate the second intermediate outputs to a higher neural network layer. The forward propagation operations can start at the first neural network layer and end at the highest neural network layer. The forward propagation operation at each neural network layer can represent different stages of extraction and processing of information from the input data set. A decision can then be made based on the output data of the highest neural network layer. For example, each neural network layer can extract and/or process features from an image, and a decision of whether an object is in the image can be generated based on a result of processing the extracted features at the neural network layers.

The set of weights of the neural network can be generated and/or updated by a training operation to improve the likelihood of the neural network generating a correct decision. The training operation can be performed by the same computing system (e.g., a neural network processor) that performs the interference operation, or by a different system. An example training operation can use a gradient descent scheme. Specifically, as part of the training operation, the aforementioned forward propagation operations can be performed on a training input data set, using the set of weights at each neural network layer, to generate a training output data set at the highest level neural network layer.

The training output data, as well as target output data, can be input to a loss gradient operation to compute first output error gradients representing a partial derivative of the output errors (between the training output data and the target output data) with respect to the training output data. At the highest neural network layer, a first backward propagation operation can be performed, in which the first output error gradients can be combined with the intermediate outputs of the previous neural network layer (the second highest neural network layer) to generate first weight gradients for the highest neural network layer. The first weight gradients can represent a partial derivative of the output errors with respect to the weights of the highest neural network layer. The first weight gradients can be used to update the weights of the highest neural network layer to minimize the output errors.

Moreover, the first output error gradients, received by the highest neural network layer, can be combined with the original weights of the highest neural network layer to obtain second output error gradients. In a second backward propagation operation, the second output error gradients can be propagated back to the previous layer to generate second weight gradients for updating the weights of the previous layer, and to generate third output error gradients to be propagated to the layer before the previous layer. The output error gradients can be propagated all the way to the first neural network layer in a sequence of backward propagation operations, and the weights of each layer can be updated based on the weight gradients generated for each layer. The training operation can be repeated for the same input data set for a number of iterations until a loss objective (e.g., a threshold first output error from the highest neural network layer) is achieved.

A training operation typically involves huge memory resources. For example, the intermediate outputs generated in the forward propagation operations for each layer are typically stored in the memory. The intermediate outputs are then fetched from the memory to support weight gradient generation of the backward propagation operations for each layer. If a large training data set is supplied to the training process, and/or the neural network being trained has a large number of layers, a large intermediate output data set can be generated from the forward propagation operations as a result. A large memory may be needed to store the large intermediate output data set as well as other data (e.g., the training data set, the weights, etc.) to support the training operation. Such a large memory capacity may not be achievable for certain types of memory devices, such as an on-chip static random access memory (SRAM) of the neural network processor, high speed memory devices (e.g., high bandwidth memory (HBM)), etc.

To perform the training operation on a computing system that has limited computation and memory resources, one approach is to divide the training data set into portions. A training operation can then be divided into batches, with each batch being performed on a portion of the training data set. The size of the training data set included in a portion can be determined such that the intermediate output data generated from the portion of training data set can be fit into the memory. The batches are then performed by the computing system sequentially. For each batch, the computing system can also perform the forward propagation and backward propagation operations for each layer sequentially, and use the memory to store and fetch the intermediate output data, weights, weight gradients, and data gradients for each layer. The computing system can update the weights of each layer in each batch until all portions of the training data set are processed. The computing system can also perform multiple iterations of the batches until the loss objective is achieved.

Although dividing the training data set to fit the respective intermediate output data into the memory can reduce the constraints imposed by the memory, such arrangements can lead to inefficiency and substantially increase the training time. Specifically, by requiring all of the intermediate output data generated from a portion of the training data set to fit into the memory, the size of the portion of the training data set may be reduced, which can lead to a large number of batches of the training operation. As each batch of the training operation is performed sequentially, and multiple iterations of the batches of the training operation may be performed to achieve the loss objective, a large number of batches can lead to a very long completion time for the whole training operation. In addition, dividing a training data set to fit the respective intermediate output data into the memory can lead to inefficient utilization of computation resources. For example, some of the computation resources on the computing system are not utilized during a batch of the training operation. This can happen when the computing system has more computation capacity than needed to process the portion of the training data and/or the intermediate outputs for the batch. As a result of the inefficient utilization of the computation resources, the training operation takes a much longer time than what the computing system could have been capable of.

Examples of the present disclosure relate to neural network processing, and more specifically, to performing a training operation of a multi-layer neural network in a computing system, such as a neural network processor. The neural network includes at least a first neural network layer and a second neural network layer. The second neural network layer can be the highest neural network layer.

As part of the training operation, the computing system can perform, based on input data to the first layer and first weights of the first neural network layer, a first forward propagation operation for the first layer to generate first intermediate outputs. The computing system can then perform, based on the first intermediate outputs and second weights of the second neural network layer, a second forward propagation operation for the second neural network layer to generate second intermediate outputs. At the end of second forward propagation operation, the computing system can store the second intermediate outputs but not the first intermediate outputs in a memory. For example, the computing system can store the first intermediate outputs in the memory during the first forward propagation operation, and then overwrite the first intermediate outputs with the second intermediate outputs in the memory during the second forward propagation operation. As the memory needs not store both first intermediate outputs and the second intermediate outputs at the same time, the training operation can accept a larger input data set and generate a larger first intermediate output data set and a larger second intermediate output data set, even in a case where the memory lacks the capacity to store both the first and second intermediate output data sets.

The computing system can then obtain the second intermediate outputs from the memory, and perform a loss gradient operation based on the second intermediate outputs and target outputs to compute first output error gradients. As the first intermediate outputs are not stored in the memory at this point, the computing system can also repeat the first forward propagation operation based on the input data to regenerate the first intermediate outputs. The computing system can then perform a first backward propagation operation for the second neural network layer to combine the first intermediate outputs with the first output error gradients to generate first weight gradients, and to combine the first output error gradients with the second weights to generate second output error gradients. The computing system can also perform a second backward propagation operation neural network layer to combine the input data with the second output error gradients to generate second weight gradients. The computing system can transmit the first weight gradients and the second weight gradients to a training module to update, respectively, the second weights of the second neural network layer and the first weights of the first neural network layer.

The training operation at the computing system can be managed by a training module. The training module can select the second intermediate outputs for storage over the first intermediate outputs, and control the computing system to repeat the first forward propagation operation, based on various criteria/methods. For example, the selection can follow a pre-defined pattern in which a subset of the neural network layers stores the intermediate outputs in the memory when the forward propagation operations complete, with each neural network layer of the subset being separated by a pre-determined number of neural network layers. As an illustrative example, the neural network layer may include groups of four neural network layers, and the pattern may specify that one neural network layer within each group is to store intermediate outputs in the memory at the end of the forward propagation operations, while the remaining three neural network layers within the group are not to store intermediate outputs at the end of the forward propagation operations. The training module can then determine that the second neural network layer is to store the second intermediate outputs while the first neural network layer is not to store the first intermediate outputs based on the pattern.

As another example, the selection can be based on various heuristics, such as the topology of the neural network, the size of the memory, the available computation resources of the computing system, etc. For example, based on the topology of the neural network, the training module can determine that the first intermediate outputs have a smaller data size than the second intermediate outputs. As another example, based on the available computation resources of the computing system, the training module can also determine that it takes a shorter time to regenerate the first intermediate outputs than the second intermediate outputs due to, for example, the first neural network layer having a lower complexity (e.g., less complex arithmetic and post-processing operations) than the second neural network layer. All these can allow the training module to select the second intermediate outputs over the first intermediate outputs for storage in the memory. In some examples, the training module can receive heuristic information indicative of the available computation and memory resources of the computing system as well as the topology of the neural network and adapt the selection based on the heuristic information, rather than following a pre-defined pattern.

With the techniques described above, the memory needs not store the intermediate outputs of all layers of the neural network prior to the backward propagation operations. This can mitigate the constraint of memory resources on the training operation and allows the training operation to operate on a larger input data set. In a case where the training operation is performed in batches, the number of batches can be reduced, which can significantly reduce the overall completion time of the training operation. Moreover, in a case where the neural network layer(s) are selected to store intermediate outputs based on heuristics (e.g., neural network topology, available computation resources, etc.), the selection can adapt to the available computation and memory resources to minimize the overall completion time of the training operation. All these can significantly improve the efficiency of the training operation.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example classifier device 100 that uses techniques disclosed herein to process data. Classifier device 100 can be, for example, a computing device operating a software application 102 and a prediction model 103 to predict information included in a data sequence, and perform a predetermined function based on the prediction. For example, classifier device 100 can be part of an image recognition service provided to identify certain objects (e.g., text, a person, etc.) from an image. It is understood that the image recognition service is merely provided as an illustrative example, and that techniques disclosed herein can be used for other data processing applications including, for example, text-based data processing (e.g., processing of search queries), audio data processing, etc. Moreover, classifier device 100 may operate a number of different prediction models to process different input data, either in parallel or at different times.

In some examples, the image recognition service can be provided in a multi-tenant compute service system. The multi-tenant compute service system may typically include a plurality of servers that can host data and be used by multiple clients or organizations to run instances, such as virtual machine instances or bare-metal instances (e.g., operating systems that run directly on the server hardware). In most instances, such as bare-metal or virtual machine instances, a multi-tenant compute service system may be allocated to a client when the client needs them and decommissioned when they are no longer needed, such that the resources can be reallocated to other clients. In the present disclosure, the terms "tenant," "client," and "customer" may be used interchangeably, although such terms do not necessarily imply the existence of any particular business arrangement. The term "instance" may refer to, for example, an instance that is executed directly on server hardware or as a virtual machine. Different types of instances generally correspond to different hardware functions and/or arrangements of hardware (e.g., different amounts of available memory and/or processing hardware). In the example of FIG. 1, the multi-tenant compute service system may provide the image recognition service when the client needs it, and the service is decommissioned when it is no longer needed, such that the resources supporting the image recognition service (e.g., access to software application 102, and the underlying hardware resources for processing software application 102) can be reallocated to other clients. Different clients (or one client) may request application 102 to perform processing of different input data using the same or different prediction models including prediction model 103.

In the example of FIG. 1, software application 102 can receive pixel data of an image 104 from a user. Image 104 may include an array of pixels. Software application 102 can perform analysis on the pixel data, and predict one or more objects 106 depicted in image 104.

The analysis may include, for example, comparing the pixel data against a set of predetermined features data. The predetermined features data may include data associated with a set of predetermined visual image features such as, for example, a nose object, a mouth object, etc. The predetermined features data may also include data associated with non-visual image features, or a combination of visual and non-visual image features. As to be discussed in more detail below, software application 102 may employ prediction model 103 to compute a set of scores based on the pixel data of image 104. The set of scores may represent, for example, the likelihood of image 104 including the image features represented by the features data. Software application 102 can then determine other information about the content of image 104 based on the scores. For example, based on the scores, software application 102 can determine that image 104 is an image of, for example, a panda, a cat, or other objects.

Prediction model 103 can be in the form of an artificial neural network. The artificial neural network may include a plurality of processing nodes, with each processing node configured to process part of the input pixel data, or to further process the intermediate outputs from other processing nodes. FIG. 1 illustrates an example of prediction model 103 that uses techniques disclosed herein. In FIG. 1, prediction model 103 may be a multi-layer neural network such as a deep neural network (DNN), a convolutional neural network (CNN), etc. Prediction model 103 may include an input layer 207, a set of intermediate layers including intermediate layers 209 and 211, and an output layer (not shown in FIG. 2A). It is understood that prediction model 103 can also include other different types of neural networks including, for example, long short-term memory (LSTM), multilayer perception (MTP), multiscale densenet (MSD-NET), etc.

Layer 207 may process pixel data representing different portions of image 104. For example, in the example of FIG. 2A, layer 207 may process the pixel data of image 204. Each processing node of layer 207 is assigned to receive a pixel value (e.g., $x_0, x_1, x_2, \ldots x_n$) corresponding to a predetermined pixel within image 104, and transmit one or more weights with the received pixel value to layer 209. In a case where prediction model 203 is a DNN, each processing node of layer 207 can be assigned a set of weights defined based on a matrix W1. Each processing node of layer 207 can send the received pixel value and the assigned weights to each processing node of layer 209. In a case where prediction model 103 is a CNN, groups of the processing nodes of layer 207 may share a set of weights, and each group may send the set of weights and the pixel values received by the group of processing nodes to a single processing node of layer 209. Different neural network models may include different topologies (e.g., including a different number of layers, different connections between layers, etc.), and/or include a different set of weights for each layer.

Layer 209 may process the scaled outputs from layer 207 to generate a set of intermediate outputs. For example, assuming processing node 210a of layer 209 is connected to n processing nodes in layer 207, processing node 210a may generate a sum of the scaled outputs received from layer 207 based on the following equation:

$$\text{sum}_{210a} = \Sigma_{i=0}^{n}(W1_i \times x_i) \quad \text{(Equation 1)}$$

Here, $\text{sum}_{210a}$ represents an intermediate output generated by processing node 210a. $W1_i \times x_i$ represents a scaling of a particular pixel value (e.g., $x_0$) with the associated weight (e.g., $W1_0$) by a processing node of layer 207. In a case where prediction model 103 is a DNN, each processing node of layer 209 may generate the sum based on the scaling of pixel values from each processing node of layer 207, and then generate a sum (e.g., $\text{Sum}_{210a}$) by summing the scaled pixel values. The sum may also represent a dot-product between an input vector comprising a number of elements (e.g., pixel values) and a weight vector (e.g., W1). In some examples, a bias can also be added the scaled outputs to generate the intermediate output.

In a case where prediction model 103 is a CNN, each processing node of layer 209 may generate the intermediate output based on the scaling of pixel values from a group of processing nodes of layers 207. The intermediate output may represent a convolution result between a group of pixel values and a filter comprising the weight values. FIG. 2B illustrates an example of a convolution operation that layer 209 may perform. In FIG. 2B, filter 230 may include a two-dimensional array of weights. The weights in filter 230 may represent a spatial distribution of pixels for certain features to be detected from the image. The two-dimensional array may have a height of R rows and a width of S columns, and is typically smaller than an input image with a height of H pixels and a width of W pixels. Each weight may be mapped to a pixel in a rectangular block of pixel values with the same R rows and S columns. A processing node of layer 209 (e.g., processing node 210a) can receive, from a group of processing nodes of input layer 207, a group 240 of pixel values corresponding to a first rectangular block of pixels from the input image, which corresponds to a first stride location of filter 230, and generate a convolution output 242 based on a summation of multiplication results between each weight of filter 230 and each corresponding pixel in group 240 according to Equation 1, to generate a dot-product between a matrix represented by filter 230 and a matrix represented by group 240. Another processing node of layer 209 can also receive, from another group of processing nodes of input layer 207, a group 244 of pixel values corresponding to a second rectangular block of pixels from the input image corresponding to a second stride location of filter 230, and generate a convolution output 246 based on a summation of multiplication results between each weight of filter 230 and each corresponding pixel in group 244 according to Equation 1, to generate a dot-product between the matrix of filter 230 and a matrix represented by group 240. In some examples, each convolution output in FIG. 2B (e.g., convolution output 242, convolution output 346, etc.) can correspond to the output of a processing node of layer 209. In some examples, the pixel data in the input image may be referred to as an input feature map to indicate that the pixels are processed by the same filter (or same sets of filters) corresponding to certain feature(s). The convolution outputs may be referred to as an output feature map to indicate that the output is the result of processing an input feature map with the filter.

As shown in FIG. 2B, the convolution operations can be arranged in a sliding-window such that the second rectangular block overlaps, or is otherwise adjacent to, the first rectangular block in the input image. For example, in the example of FIG. 2B, D may be a distance of stride (in pixel) of the sliding-window for each convolution operation, such that the block of pixels corresponding to group 244 may be situated at a distance D (in terms of pixels) from the block of pixels corresponding to group 240, and the next block of pixels may also be situated at the same distance D from group 244. Other processing nodes of layer 209 may also receive groups of pixels corresponding to other rectangular blocks and generate other intermediate outputs. The convolution outputs can be part of a convolution output array. The array of convolution outputs can have a smaller height and a smaller width than the input image. Rectangular blocks of the convolution outputs can be further grouped, and convolution operations can be performed at layer 211 between the groups of convolution outputs and another set of filter weights to generate another set of convolution outputs.

Referring back to FIG. 2A, one processing node of layer 209 may be configured to generate the convolution output elements of one convolution output array, and a set M of processing nodes of layer 209 can correspond to a set M of convolution output arrays. The processing node of layer 209 can also process each convolution output with an activation function to generate an activation output. The activation function may translate the convolution output into a decision of whether to forward the convolution output to intermediate layer 211 to influence the classifier decision (analogous to the firing of a biological neuron). An example of the activation function can be a rectified linear unit (ReLU) defined according to the following equation:

$$ReLU(x) = \begin{cases} x & \text{for } x \geq 0 \\ 0 & \text{for } x < 0 \end{cases} \quad \text{(Equation 2)}$$

In addition to ReLU, other forms of activation function can also be used including, for example, a softplus function (which can be a smooth approximation of a ReLU function), a hyperbolic tangent function (tanh), an arc tangent function (arctan), a sigmoid function, a Gaussian function, etc.

A processing node of layer 209 (e.g., processing node 210a) may process the sum with the ReLU function to generate a first output of layer 209 based on the following equation:

$$\text{first\_output}_{210a} = ReLU(\text{Sum}_{210a}) \quad \text{(Equation 3)}$$

Optionally, prediction model 103 may include a pooling layer to reduce the number of intermediate outputs (e.g., $\text{sum}_{210a}$) layer 209. The pooling layer may group the intermediate, of outputs and perform a pooling operation on each group. The pooling operation may include such as max pooling (e.g., selecting a maximum intermediate output within the group), min pooling (e.g., selecting a minimum intermediate output), average pooling (e.g., finding an average of each group), summation pooling (finding a sum of each group), etc., and the reduced intermediate outputs can be processed by the activation function to generate first outputs of layer 209. The pooling operation can be performed to reduce the computation cost associated with activation function processing.

Layer 211 may further process the scaled intermediate outputs from layer 209 by, for example performing additional convolution operations based on different sets of filters. The outputs from each processing node of layer 211 may be forwarded to other higher intermediate layers, or to an output layer (not shown in FIG. 2A). The output layer may form an output vector representing, for example, a probability that certain features are included in image 104, and/or a probability that image 204 includes an image of a panda. For example, the output vector may be compared against a reference vector associated with a nose object of a panda, or a reference vector associated with a panda. A decision about whether image 104 is an image of a panda can be determined based on the comparison result.

Figure 2A:
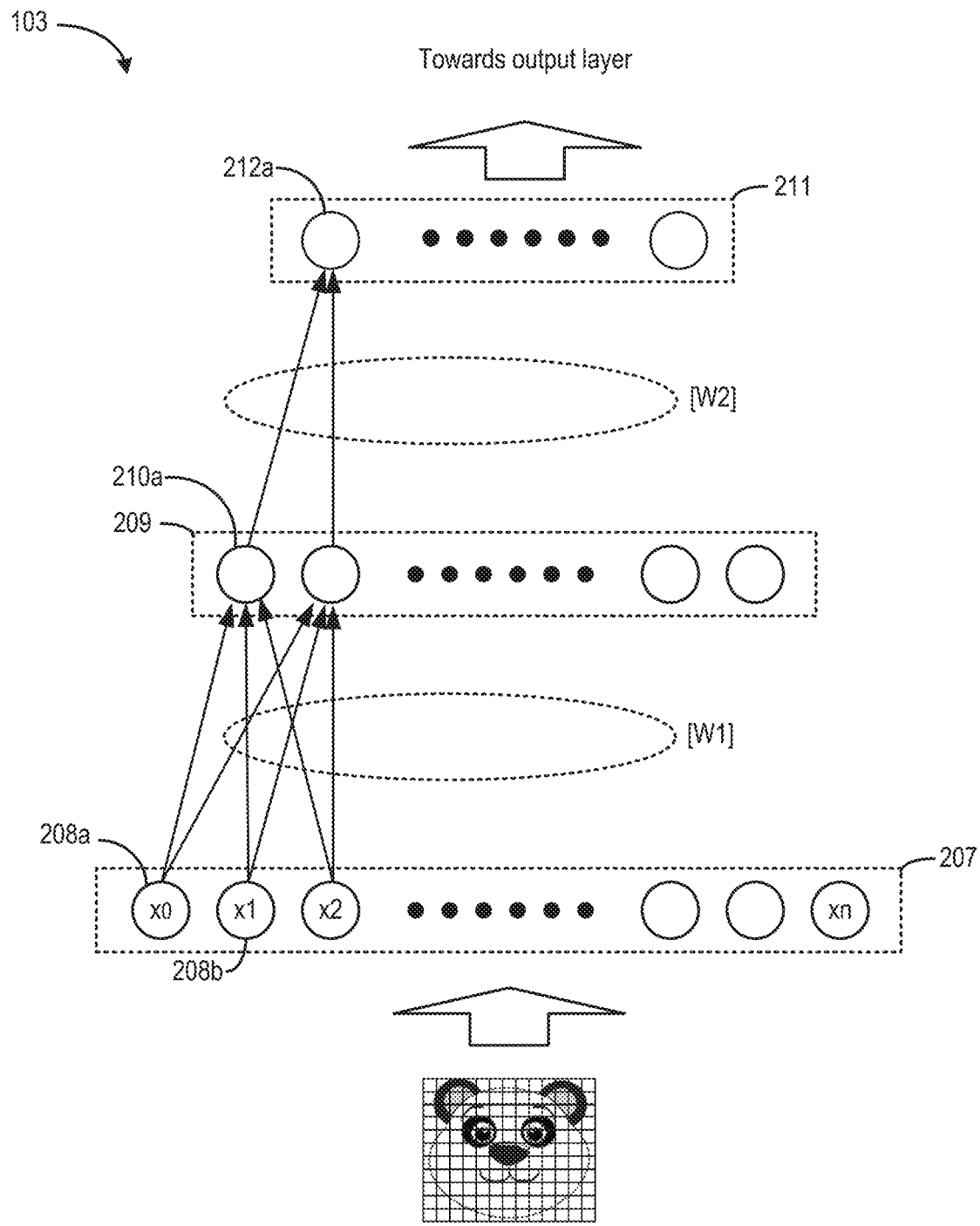
FIGS. 2A-2B are simplified block diagrams illustrating a prediction model and the computations that use techniques disclosed herein, according to certain aspects of the present disclosure.
Figure 2B:
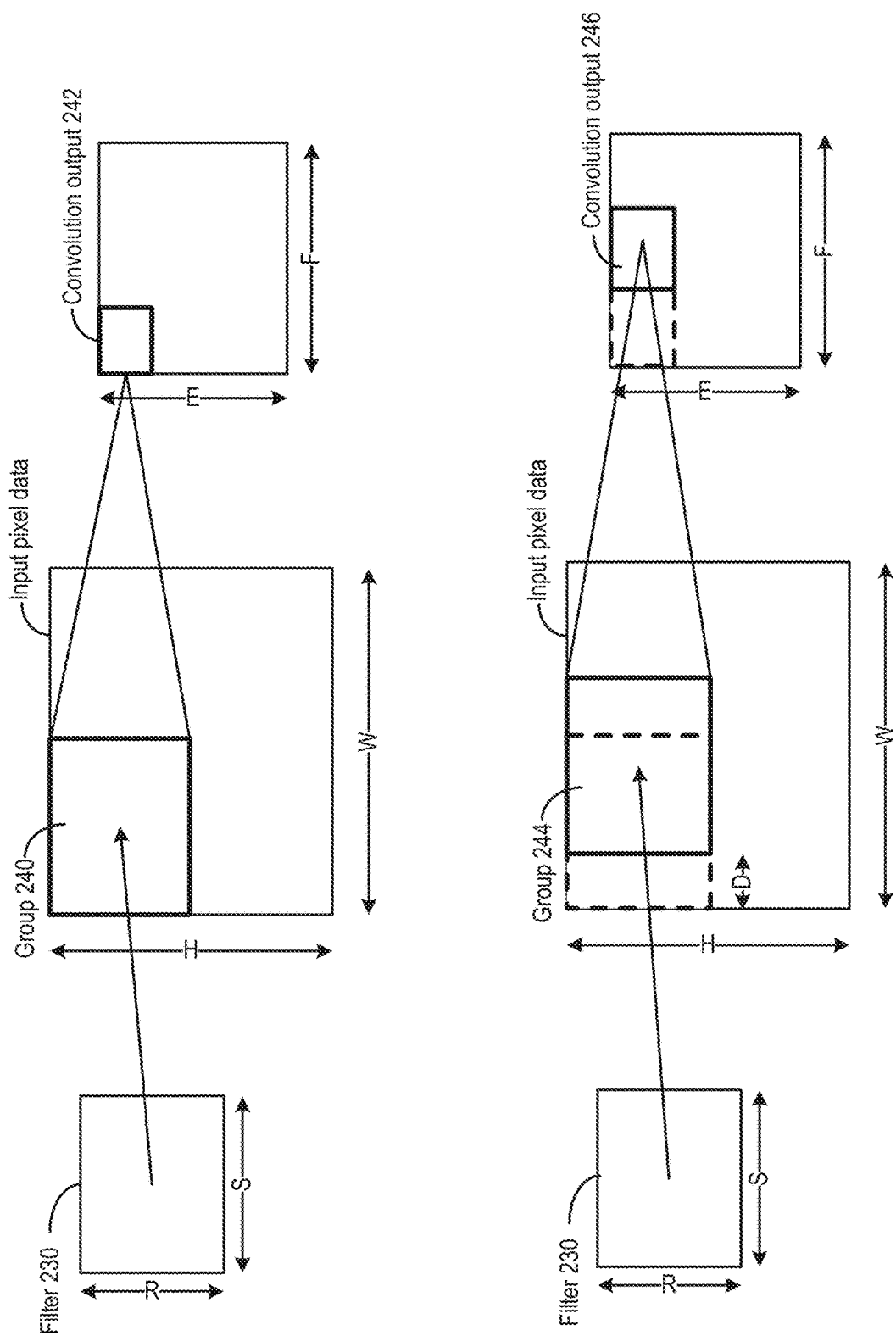

The weights and filter coefficients described in FIG. 2A and FIG. 2B can be generated and updated by a training process, to improve the likelihood of prediction model 103 generating a correct decision. Referring to the examples of FIG. 2A and FIG. 2B, prediction module 103 can be trained based on a set of training images. The training images can include images of different pandas, images of other animals and other artifacts, etc. Prediction model 103 can process those images and generate different output vectors. The weights in the neural network layers of prediction model 103 can be updated to maximize the number of correct decisions (e.g., detection of a panda in training images that contain a panda, non-detection of a panda in training images that do not contain a panda, etc.) by the prediction model 103.

Figure 3A:
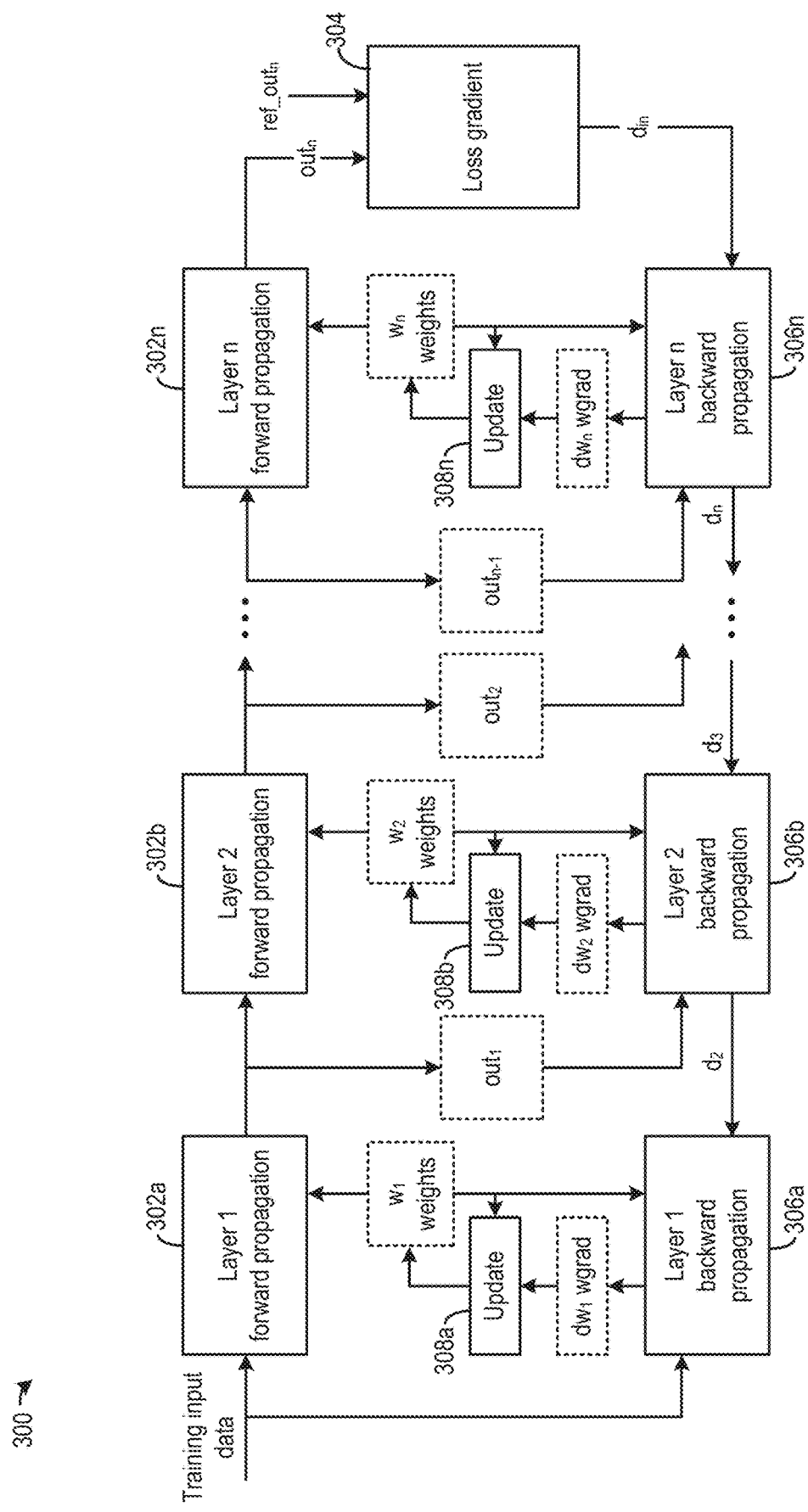
FIGS. 3A-3D illustrate examples of a training operation of a neural network.

FIG. 3A illustrates an example of a training process 300 to train a neural network, including the neural network of prediction model 103. A training process can be performed by, for example, a neural network hardware accelerator that implements the neural network, a general purpose hardware processor, or other suitable computing systems that support the arithmetic operations involved in neural network processing as described above. The training can be based on a gradient descent scheme, which includes forward propagation operations, a loss gradient operation, and backward propagation operations. Specifically, as shown in FIG. 3A, a forward propagation operation can be performed for each neural network layer, such as a forward propagation operation 302a for the lowest layer 1 (which can correspond to input layer 207 of FIG. 2A), a forward propagation operation 302a for layer 2 (which can correspond to layer 209 of FIG. 2A), a forward propagation operation 302n for the highest layer n (which can correspond to layer 211 of FIG. 2A), etc. A forward propagation operation at a neural network layer can include the multiplication and summation computations between input data and a set of weights for that layer, followed by activation function processing, as described above in Equations 1 and 2, to generate intermediate output data. The intermediate output data can then propagate to the next neural network layer as input to the forward propagation operation at that layer. For example, as shown in FIG. 3A, forward propagation operation 302a can combine training input data with $w_1$ weights of layer 1 to generate intermediate output data $\text{out}_1$, which propagate to layer 2 as input. Forward propagation operation 302b can combine data $\text{out}_1$ with $w_2$ weights of layer 2 to generate intermediate output data $\text{out}_2$, which can then propagate to the next layer. At the highest layer n, forward propagation operation 302n receives data intermediate $\text{out}_{n-1}$ from layer n-1 (not shown in FIG. 3A), combines with $w_n$ weights of layer n, and generate intermediate output data outs.

A loss gradient operation 304 can compare the intermediate output data $\text{out}_n$ of layer n against reference output data $\text{ref\_out}_n$ to generate output error gradients $d_{in}$. Output error data gradients $d_{in}$ can measure a partial derivative of the output error, represented by the difference between outs and $\text{ref\_out}_n$, with respect to each data element of output data $\text{out}_n$. In some examples, an objective of the training is to minimize the difference between outs and $\text{ref\_out}_n$ such that the output error gradients $d_{in}$ can become close to zero.

Following the generation of error gradients $d_{in}$ by loss gradient operation 304, a backward propagation operation 306 can be performed for each neural network layer. For example, a backward propagation operation 306n can be performed at highest layer n, a backward propagation operation 306b can be performed at layer 2, a backward propagation operation 306a can be performed at layer 1. A backward propagation operation at a neural network layer can be based on the weights of that neural network layer, the data gradient input to that neural network layer, as well as the input to the forward propagation operation of that layer.

For example, for layer n, backward propagation operation 306n can receive, as inputs, weights wn, intermediate output data $out_{n-1}$ (from forward propagation operation at neural network layer n-1), and error gradients $d_{in}$. The backward propagation operation can perform multiplication and summation computations similar to those of Equations 1 and 2 on the inputs to generate weight gradients wgrad ($dw_n$, $dw_2$, $dw_1$, etc. in FIG. 3A) and output data gradients ($d_n$, $d_3$, $d_2$, etc. in FIG. 3A).

Weight gradients wgrad of a neural network layer can represent a partial derivative of the output error with respect to each weight of the neural network layer, and can be used to update the weights of the neural network layer. The weight gradients can be generated based on the intermediate outputs of a previous layer and the input data gradients to that neural network layer. For example, at layer n, weight gradients $dw_n$ can be generated based on the intermediate outputs $out_{n-1}$ and error gradients $d_{in}$, whereas at layer n-1, weight gradients $dw_{n-1}$ can be generated based on the intermediate outputs $out_{n-2}$ and the output data gradients of layer n, $d_n$.

The weights at layer n can be updated by an update operation 308 (e.g., update operation 308n for layer n) based on the weight gradients dwn based on the following equation:

$$wn' = wn - \alpha \times dwn \quad \text{(Equation 3)}$$

In Equation 3, wn' can refer to the updated weights wn, whereas α can include a set of pre-determined constants.

In addition, the output data gradients of a neural network layer can represent a partial derivative of the output error with respect to the product sums at the neural network layer. The output data gradients can be forwarded to the next lower neural network layer as inputs to the backward propagation operation in that layer to compute the weight gradients in that layer. For example, as described above, the output data gradients of layer n, $d_n$, can be propagated to layer n-1 to compute weight gradients $dw_{n-1}$. The output data gradients of a neural network layer can be generated based on the input data gradients to that neural network layer, as well as the original weights (prior to being updated with the weight gradients) of that neural network layer. For example, at layer n, the output data gradients $d_n$ can be generated based on weights $w_n$ as well as error gradients $d_{in}$ in backward propagation operation 306n.

The output data gradients $d_n$ generated by layer n can then propagate to the next lower neural network layer n-1 as input to the backward propagation operation at that layer. Backward propagation operation 306b of layer 2 can operate on data gradients $d_3$, weights $w_2$, and intermediate output data $out_1$ to generate output data gradients $d_1$ as well as weight gradients $dw_2$. Weight gradients $dw_2$ can be used by update operation 308b to update $w_2$ weights based on Equation 3. Data gradients $d_2$ can propagate to layer 1. Backward propagation operation 306a of layer 1 can operate on data gradients $d_2$, weights $w_1$, and training input data to generate weight gradients $dw_1$. Weight gradients $dw_1$ can be used by update operation 308a to update $w_1$ weights based on Equation 3.

A training process typically involves supplying the neural network with multiple sets of training input data to cover different operation conditions, such that the neural network can be trained to provide a correct decision under those different operation conditions. Due to limited computation resources, the computing system (e.g., a neural network hardware accelerator) typically lacks the capability to use all the training input data sets at one time to perform the training.

Figure 3B:
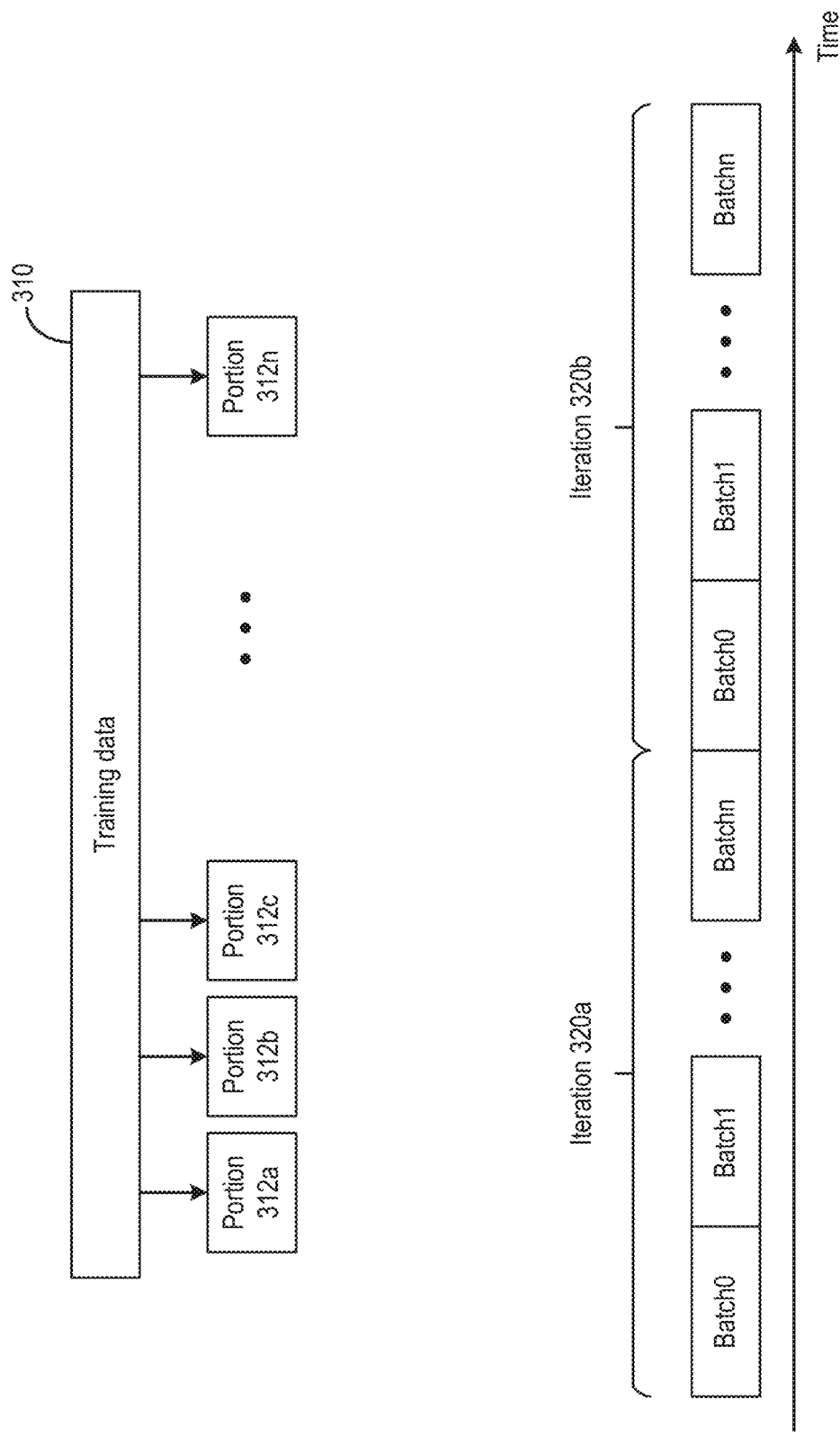

FIG. 3B illustrates one example solution to perform the training operation on a computing system that has limited computation and memory resources. As shown in FIG. 3B, a training data set 310 can be divided into portions including portion 312a, 312b, 312c, 312n, etc. Moreover, a training operation can then be divided into batches, such as batch0, batch1, batchn, etc., with each batch being performed on a portion of the training data set. As shown in FIG. 3B, the computing system can perform the batches of training operation sequentially. For each batch, the computing system can also perform the forward propagation operations 302, loss gradient operations 304, backward propagation operations 306, and weight update operations 308 for each layer. The computing system can update the weights of each layer in each batch until all portions of the training data set are processed. The computing system can also perform multiple iterations of the batches, such as iterations 320a, 320b, etc., until the loss objective is achieved.

Figure 3C:
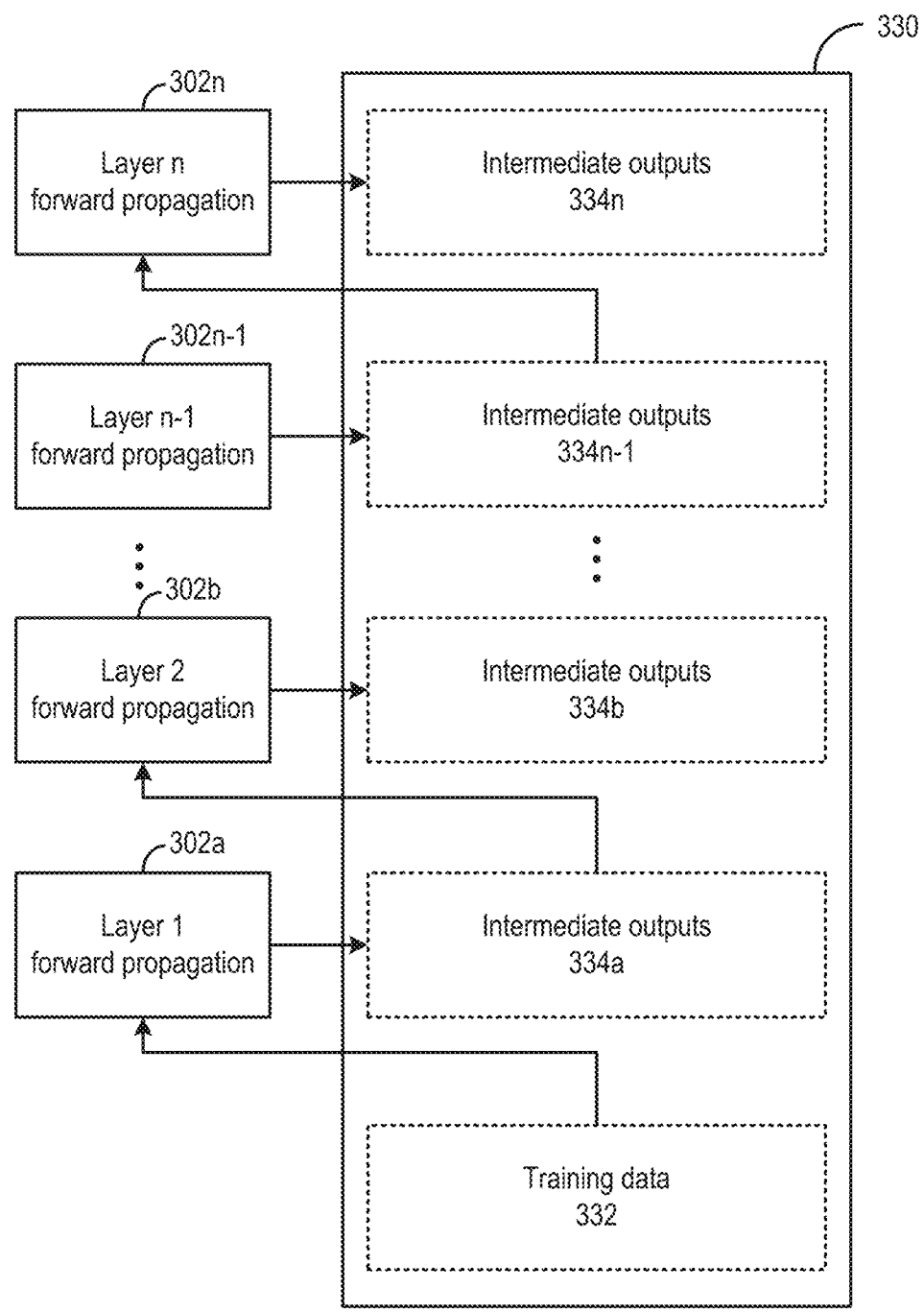
Figure 3D:
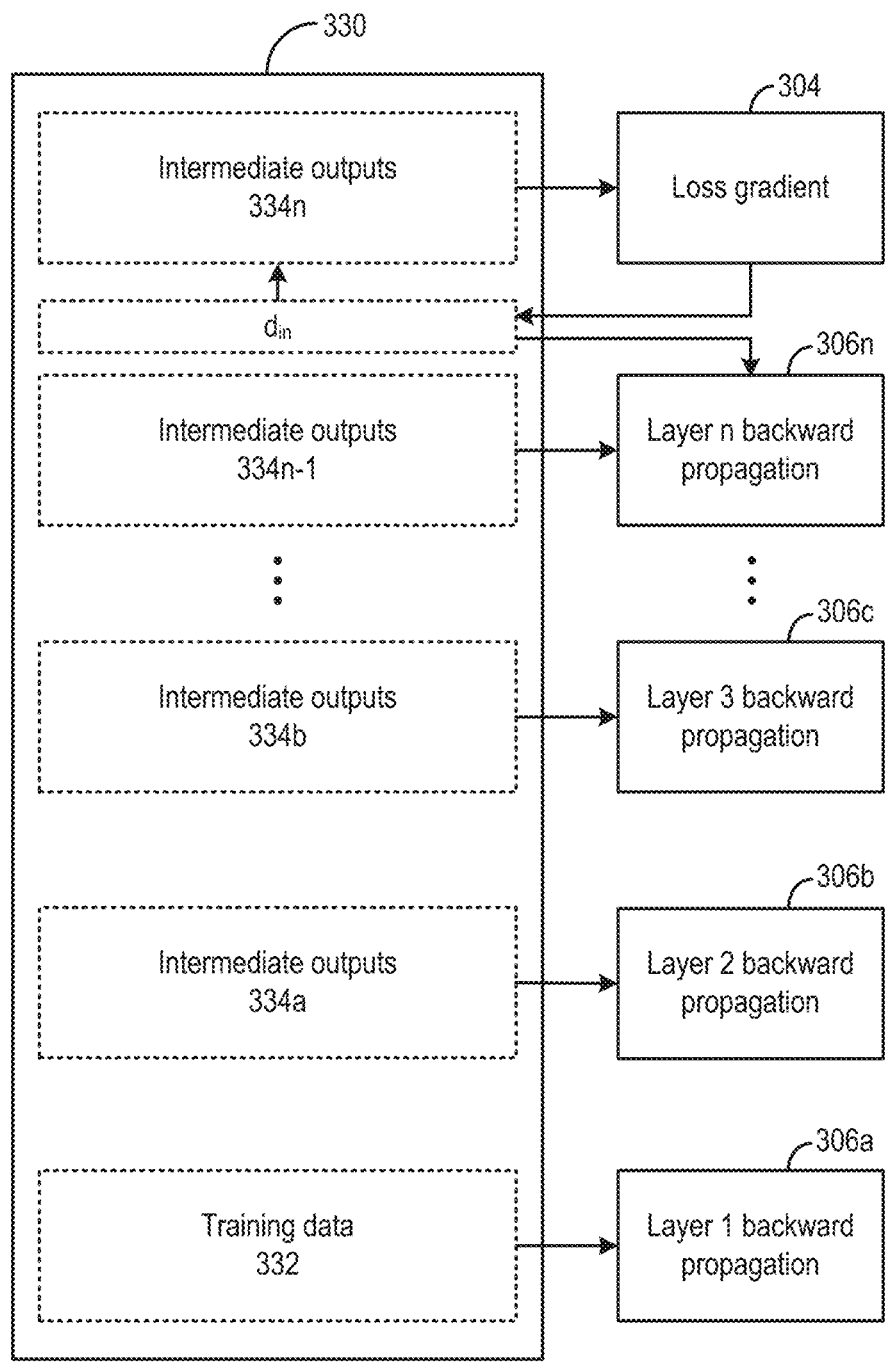

The transmission of data involved in the training operation at each neural network layer is typically achieved via a memory. The memory may include an on-chip static random access memory (SRAM) of the neural network processor, high speed memory devices (e.g., high bandwidth memory (HBM)), etc. FIG. 3C and FIG. 3D illustrate examples of memory operations involved in a training operation batch. Referring to FIG. 3C, a memory 330 is provided to store the data involved in the batch 0 training operation, such as input data, intermediate outputs, weights, bias, etc. The forward propagation operation of a layer can obtain input data from memory 330 and writes intermediate outputs back to memory 330. For example, layer 1 forward propagation operation 302a can obtain training data 332 from memory 330, generate intermediate outputs 334a, and store intermediate outputs 334a in memory 330. Moreover, layer 2 forward propagation operation 302b can obtain intermediate outputs 334a, generate intermediate outputs 334b, and store intermediate outputs 334b in memory 330. Layer n-1 forward propagation operation 302n-1 can also store intermediate outputs 334n-1 in memory 330, whereas layer n forward propagation operation 302n can store intermediate outputs 334n in memory 330. After the forward propagation operations at each layer complete, the intermediate outputs of each layer are stored in memory 330 to be provided as inputs to the subsequent loss gradient and backward propagation operations.

FIG. 3D illustrates the memory access operations involved in the loss gradient and backward propagation operations. As shown in FIG. 3D, loss gradient operation 304 can obtain intermediate outputs 334n (and reference intermediate outputs, not shown in FIG. 3D) to generate output error gradients $d_{in}$ based on a comparison between the reference intermediate outputs and intermediate outputs 334n, and store output error gradients $d_{in}$ back to memory 330. The data size of output error gradients $d_{in}$ can be the same as or different from intermediate outputs 334n. As intermediate outputs 334n are no longer needed by other operations, output error gradients $d_{in}$ can overwrite part of or all of intermediate outputs 334n in memory 330. Layer n backward propagation operation 306n can then obtain error gradients $d_{in}$ as well as intermediate outputs 334n-1 (generated by layer n-1) from memory 330 to compute weight gradients dwn and data gradients dn, and store both in memory 330 (not shown in FIG. 3D). The backward propagation operations at other layers also obtain the intermediate outputs from memory 330. For example, layer 3 backward propagation operation 306c can obtain intermediate outputs 334b (generated by layer 2) from memory 330, layer 2 backward propagation operation 306b can obtain intermediate outputs 334a (generated by layer 1) from memory 330, whereas layer 1 backward propagation operation 306a can obtain training data 332 from memory 330.

To ensure that memory 330 can store the intermediate outputs of each layer, the size of the portion of input training data in a batch has to be carefully selected such that the total size of intermediate outputs generated by each layer, from the portion of input training data, does not exceed the capacity allocated for the intermediate outputs. But this can lead to inefficiency and substantially increase the training time. Specifically, by requiring all of the intermediate output data generated from a portion of the training data set to fit into the memory, the size of the portion of the training data set may become quite small, which can lead to a large number of batches of the training operation. As each batch of the training operation is performed sequentially, and multiple iterations of the batches of the training operation may be performed to achieve the loss objective, a large number of batches can lead to a very long completion time for the whole training operation.

In addition, providing a small training data set to a computing system in a batch can lead to inefficient utilization of computation resources. For example, some of the computation resources on the computing system may not be utilized during a batch of the training operation.

Figure 4:
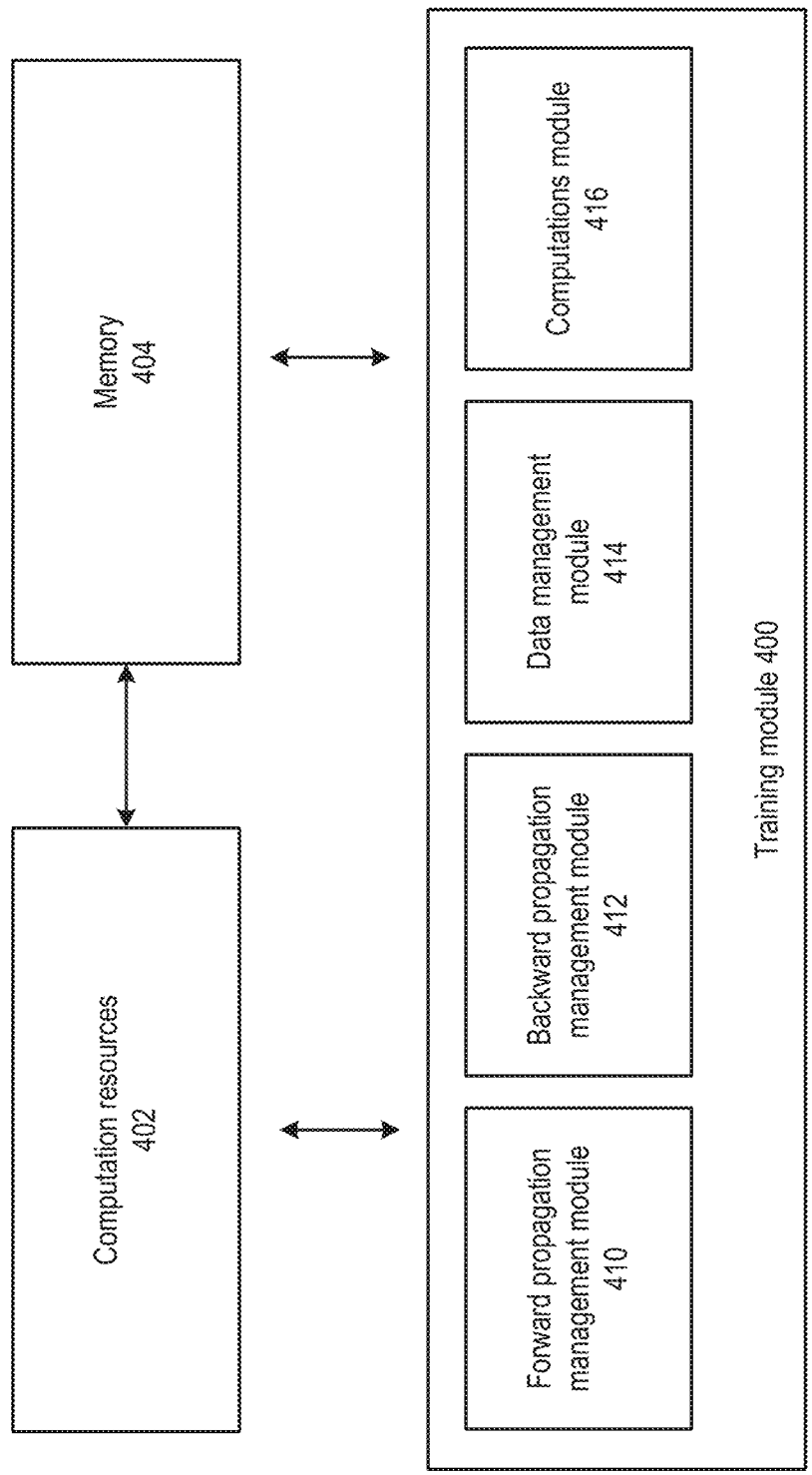
FIG. 4 illustrate examples of a training module to control a training operation at a neural network processor, according to certain aspects of the present disclosure.

This can happen when the computing system has more computation capacity than needed to process the portion of the training data and/or the intermediate outputs for the batch. As a result of the inefficient utilization of the computation resources, the training operation takes a much longer time than what the computing system could have been capable of FIG. 4 illustrates an example training module 400 which can address at least some of the issues described above. Training module 400 can manage computation resources 402 and memory 404 to perform a training operation of a neural network. Computation resources 402 can include computation hardware (e.g., arithmetic circuits, lookup tables, etc.) provided by a neural network processor 406 to perform neural network computations, such as forward propagation operations, backward propagation operations, loss gradient computations, weight gradient and data gradient computations, weight updating computations, etc. Moreover, memory 404 can be part of on-chip memory of neural network processor 406, off-chip high speed memory devices (e.g., high bandwidth memory (HBM)), etc. In some examples, training module 400 can include software instructions executable by a host processor of a server that also includes the neural network processor and memory 404.

Referring to FIG. 4, training module 400 includes a forward propagation management module 410, a backward propagation management 412, an intermediate output management module 414, and computation module 416, to perform the training operation. Forward propagation management module 410 can control computation resources 402 to perform forward propagation operations sequentially for each layer starting from layer 1 and ending at layer n (the highest layer), such as operations 302a-302n of FIG. 3A, and signal the status of forward propagation operation at each layer. Backward propagation management module 412 can control computation resources 402 to perform the loss gradient operation and backward propagation operations sequentially for each layer starting from layer n (highest layer) back to layer 1, such as operations 306a-306n of FIG. 3A, and signal the status of backward propagation operation at each layer.

Data management module 414 can manage the storage and fetching of data involved in the training operation, including the intermediate outputs for the forward propagation operations and the backward propagation operations. Specifically, data management module 414 can select a subset of layers for which the intermediate outputs are to be retained in memory 404 at the end of the forward propagation operations and prior to the loss gradient operation, while the intermediate outputs of the rest of the layers are not retained. Together with forward propagation management module 410, data management module 414 can control the storage and fetching of intermediate outputs for each layer during the forward propagation operations.

In addition, data management module 414 can also control the fetching (or provision) of intermediate outputs for the backward propagation operation at each layer. For example, data management module 414 may receive a signal from backward propagation management module 412 that the backward propagation of a particular layer is about to start. If the intermediate outputs for that layer are not stored in memory 404, data management module 414 causes forward propagation management module 410 to control computation resources 402 to repeat a forward propagation operation to regenerate intermediate outputs not stored in memory 404, and to provide the regenerate intermediate outputs for that layer. Data management module 414 can also manage the storage and fetching of other data, such as input training data, output error gradients, data gradients, weight gradients, weights, bias, etc.

Computations module 416 can handle the computations not handled by neural network processor 406 such as, for example, pre-processing of training data. For example, in a case where the training data contain image data, computations module 416 can perform cropping (or other pre-processing) operations of the image data to extract pixel data of objects of interest and to include the extracted pixel data into the training data. As another example, neural network processor 406 may not perform some of the training operations, such as loss gradient computations, weight and data gradient computations, weight updating computations, etc. In such a case, computations module 416 can handle those operations, and store the updated weights back to memory 402.

As data management module 414 selects only a subset of layers for which the intermediate outputs are to be retained in memory 404 at the end of the forward propagation operations and prior to the loss gradient operation, memory 404 needs not store the intermediate outputs of all layers of the neural network prior to the backward propagation operations. This allows the training operation to operate on a larger input data set. In a case where the training operation is performed in batches, the number of batches can be reduced, which can significantly reduce the overall completion time of the training operation.

Figure 5A:
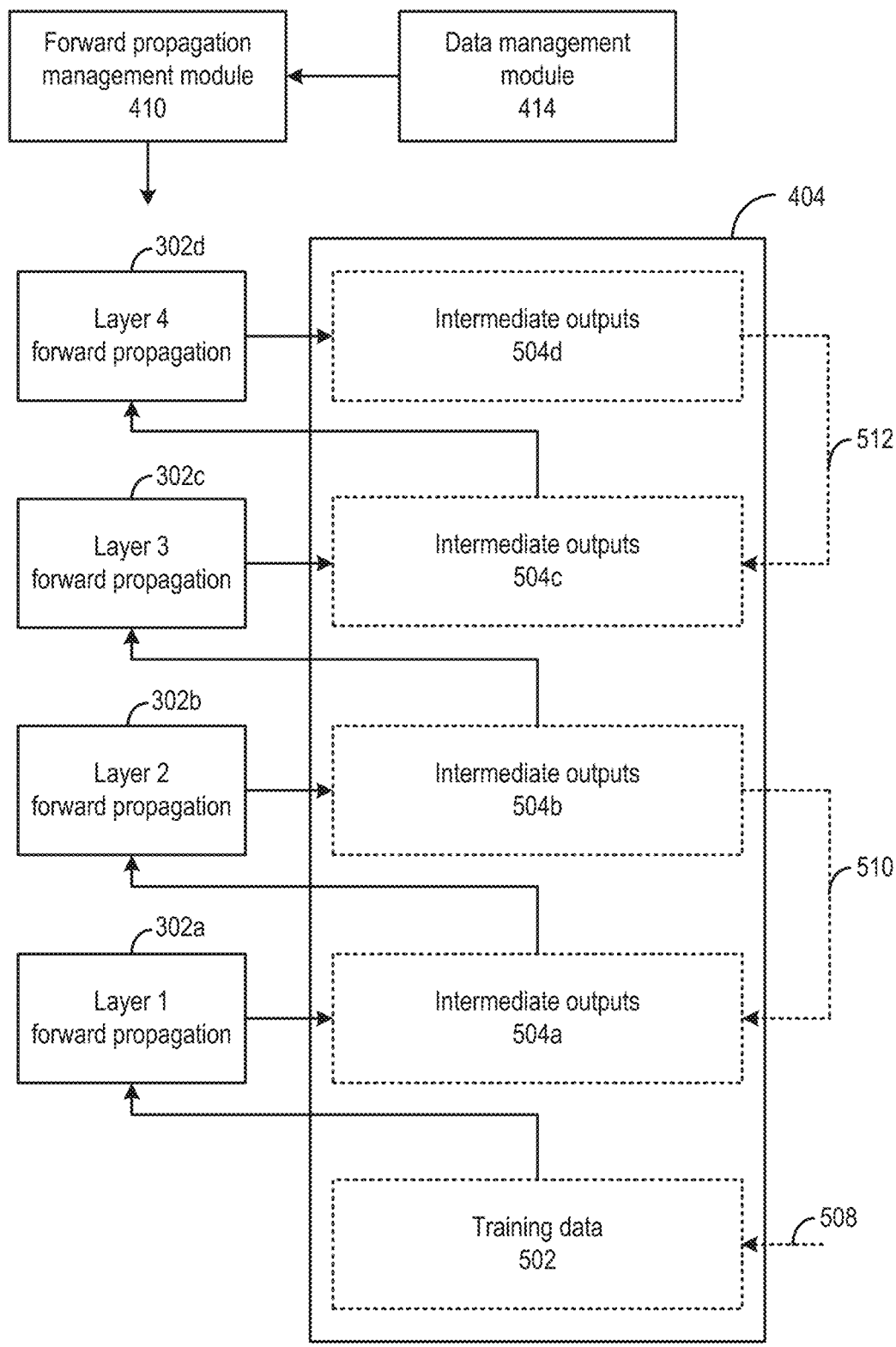
FIGS. 5A-5B illustrate examples of a training operation controlled by the training module of FIG. 4, according to certain aspects of the present disclosure.
Figure 5B:
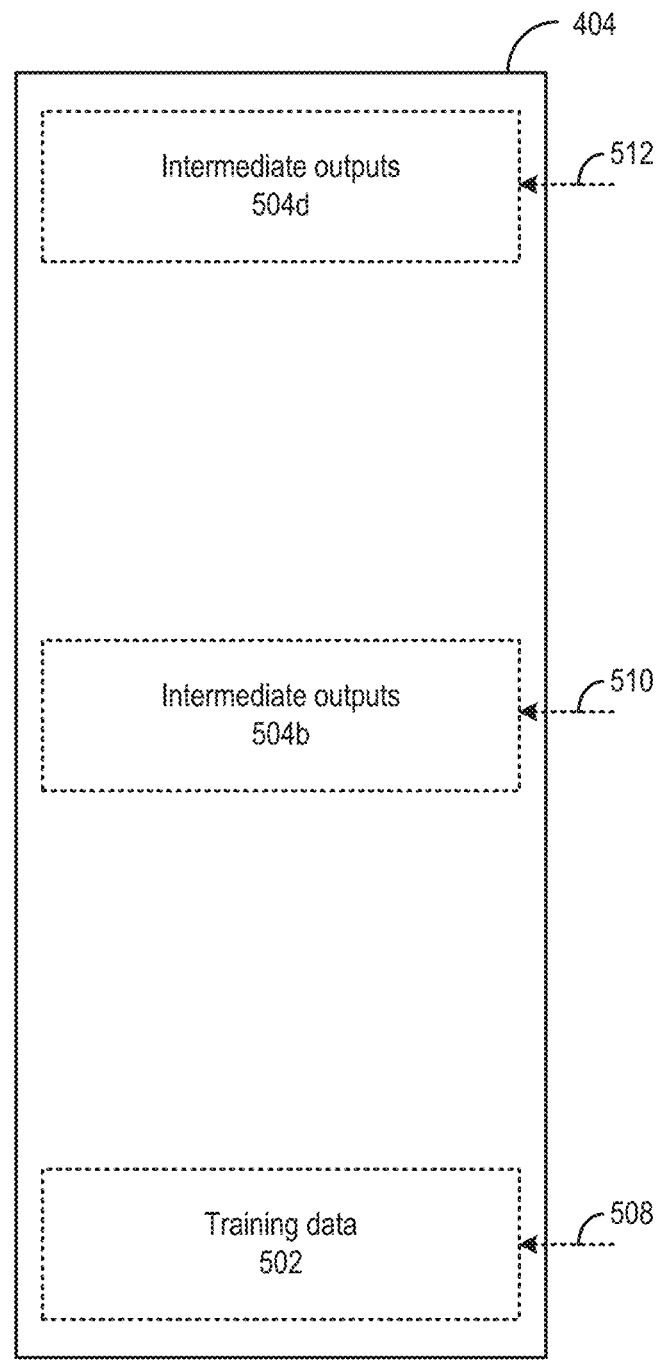

FIG. 5A and FIG. 5B illustrate an example sequence of forward propagation operations and the associated memory access operations managed by training module 400, for a four-layer neural network. In the examples shown in FIG. 5A and FIG. 5B, data management module 414 is to select every other layer, including layer 2 and layer 4, to retain intermediate outputs in memory 404 at the end of all forward propagation operations. In addition, input training data 502 is also stored in memory 404.

Referring to FIG. 5A, forward propagation management module 410 can control neural network processor 406 to perform layer 1 forward propagation operation 302a based on training data 502. Neural network processor 406 can obtain training data 502 from memory 404 based on a memory address 508 provided by data management module 414 and generate intermediate outputs 504a. Neural network processor 406 can store intermediate outputs 504a in memory 404 at a memory address 510 provided by data management module 414.

Forward propagation management module 410 can then control neural network processor 406 to perform layer 2 forward propagation operation 302b based on intermediate outputs 504a. Neural network processor 406 can obtain intermediate outputs 504a from memory 404 based on memory address 510 provided by data management module 414 and generate intermediate outputs 504b. As intermediate outputs 504a (generated by layer 1) are not to be retained, data management module 414 can instruct neural network processor 406 to store intermediate outputs 504b at memory address 510 to overwrite intermediate outputs 504a.

Forward propagation management module 410 can then control neural network processor 406 to perform layer 3 forward propagation operation 302c based on intermediate outputs 504b. Neural network processor 406 can obtain intermediate outputs 504b from memory 404 based on memory address 510 provided by data management module 414 and generate intermediate outputs 504c. As intermediate outputs 504b (generated by layer 2) are to be retained, data management module 414 can instruct neural network processor 406 to store intermediate outputs 504c at memory address 512 separate from intermediate outputs 504a.

Forward propagation management module 410 can then control neural network processor 406 to perform layer 4 forward propagation operation 302d based on intermediate outputs 504c. Neural network processor 406 can obtain intermediate outputs 504c from memory 404 based on memory address 510 provided by data management module 414 and generate intermediate outputs 504d. As intermediate outputs 504c (generated by layer 3) are not to be retained, data management module 414 can instruct neural network processor 406 to store intermediate outputs 504d at memory address 512 to overwrite intermediate outputs 504c. As shown in FIG. 5B, at the end of the forward propagation operations, memory 404 can store training data 502 at memory address 508, intermediate outputs 504b and 504d from layers 2 and 4 at memory addresses 510 and 512, plus some other data, but not intermediate outputs 504a and 504c from layers 1 and 3.

FIG. 6A, FIG. 6B, FIG. 6C, FIG. 6D, and FIG. 6E illustrate example sequences of loss gradient operations, backward propagation operations, forward propagation operations, and the associated memory access operations managed by training module 400, subsequent to the forward propagation operations of FIG. 5A and FIG. 5B.

Figure 6A:
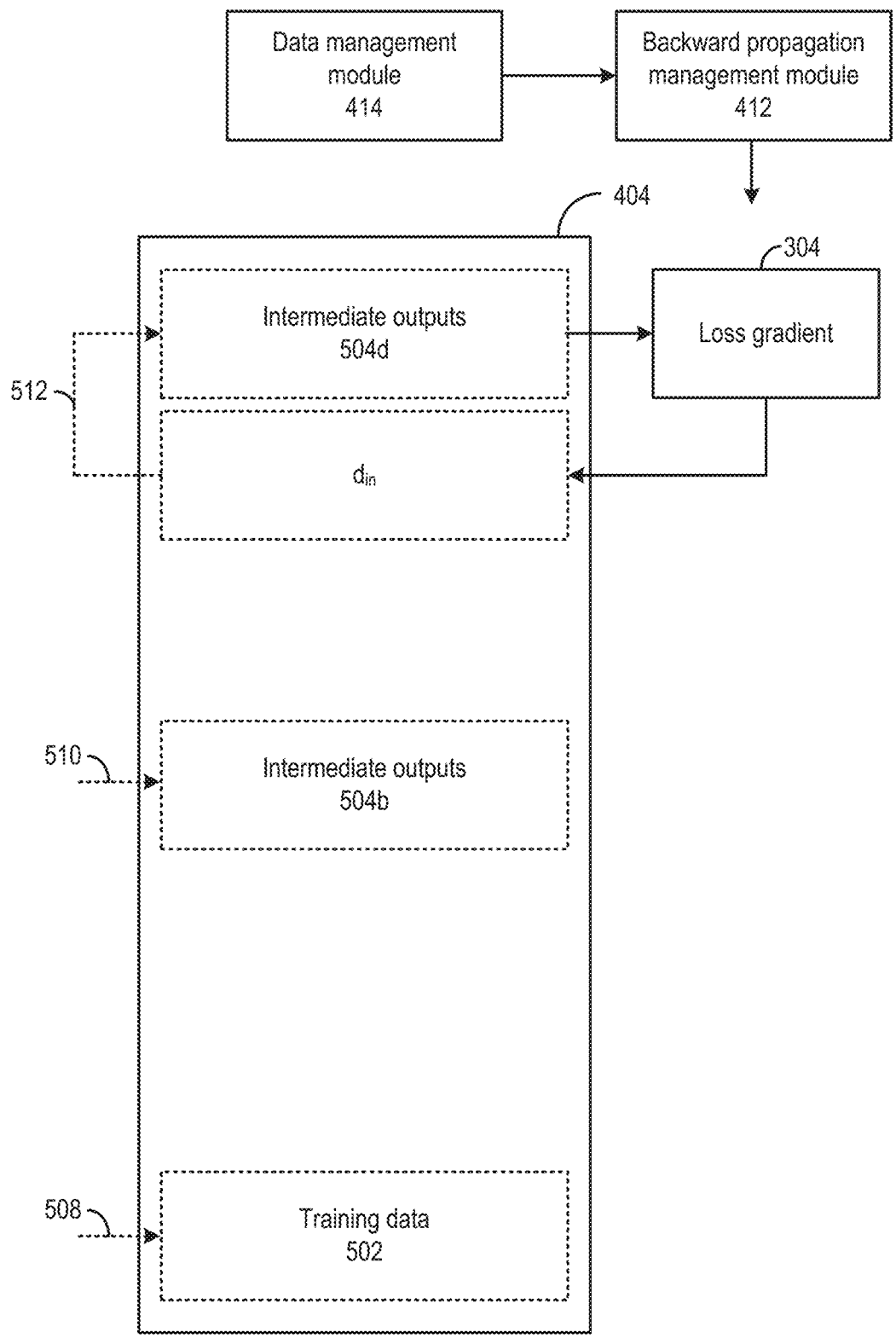
FIGS. 6A-6E illustrate examples of a training operation controlled by the training module of FIG. 4, according to certain aspects of the present disclosure.

Referring to FIG. 6A, computations module 416 (of training module 400) can perform loss gradient operation 304 based on intermediate outputs 504d. Computations module 416 can obtain reference intermediate outputs (not shown in FIG. 6A) and intermediate outputs 504d from memory 404 based on memory address 510 provided by data management module 414, and generate output error gradients $d_{in}$ based on a comparison between intermediate outputs 504d and reference intermediate outputs. As intermediate outputs 504d are not needed after loss gradient operation 304, data management module 414 can instruct computations module 416 to store output error gradients $d_{in}$ at memory address 512 to overwrite intermediate outputs 504d.

Figure 6B:
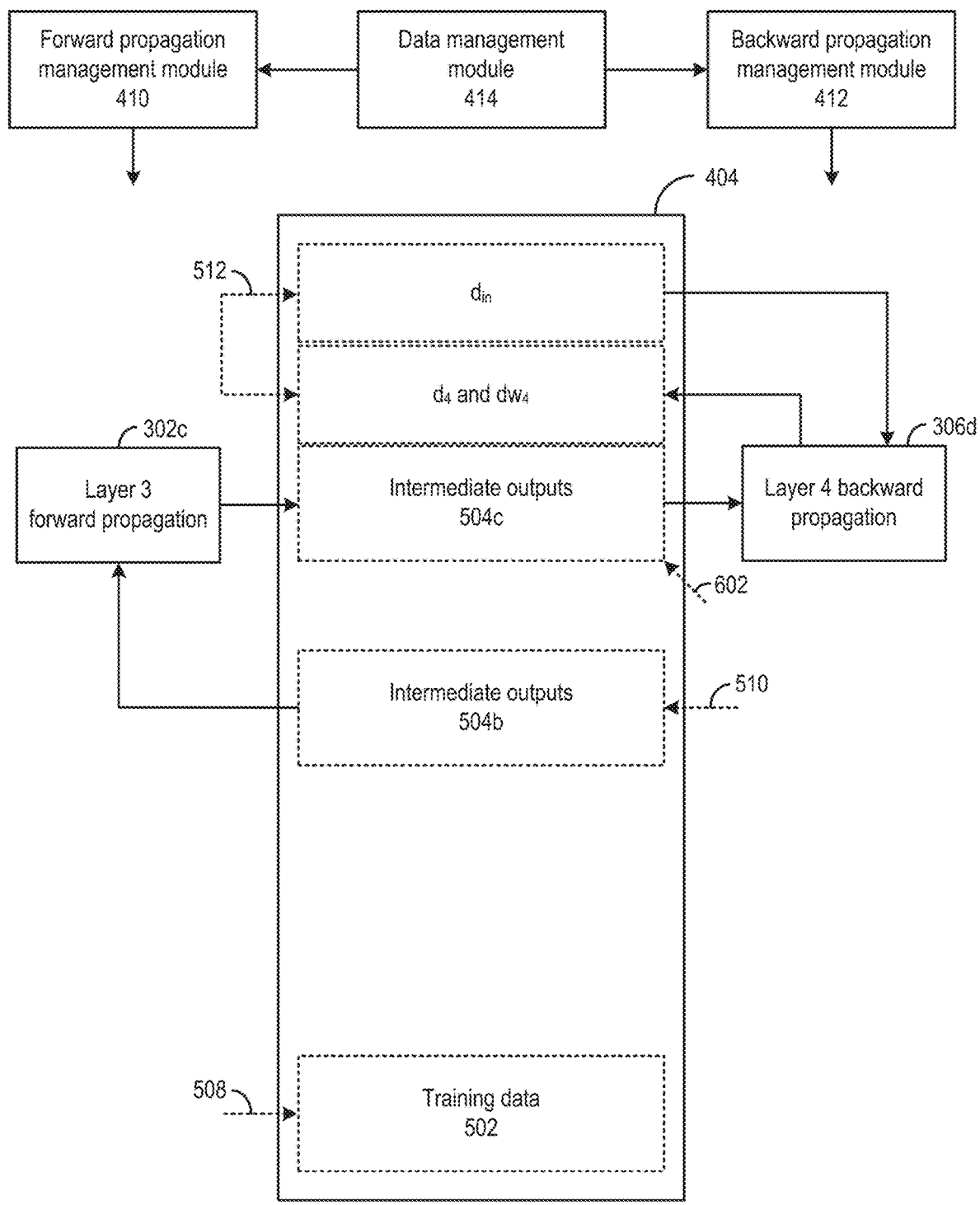

Referring to FIG. 6B, backward propagation management module 412 can then control neural network processor 406 to perform a layer 4 backward propagation operation 306d, which needs output error gradients $d_{in}$ and intermediate outputs 504c from layer 3. But intermediate outputs 504c are not retained after the forward propagation operations complete, as explained above. Data management module 414, via forward propagation management module 410, can control neural network processor 406 to repeat layer 3 forward propagation operation 302c to regenerate intermediate outputs 504c. Neural network processor 406 can obtain intermediate outputs 504b from memory address 510 to perform layer 3 forward propagation operation 302c, and store intermediate outputs 504c at a memory address 602 of memory 404. Neural network processor 406 can then fetch output error gradients $d_{in}$ from memory address 512 and intermediate outputs 504c from memory address 602 to perform layer 4 backward propagation operation 306d. As output error gradients $d_{in}$ are not used by other subsequent processes, data management module 414 can instruct neural network processor 406 to store the outputs of layer 4 backward propagation operation 306d, including data gradients $d_4$ and weight gradients $dw_4$, at memory address 512 to overwrite output error gradients $d_{in}$. Intermediate outputs 504c are also not needed in subsequent operations and can be overwritten later. Computations module 416 can also obtain weight gradients $dw_4$ from memory address 512 to update the weights of layer 4.

Figure 6C:
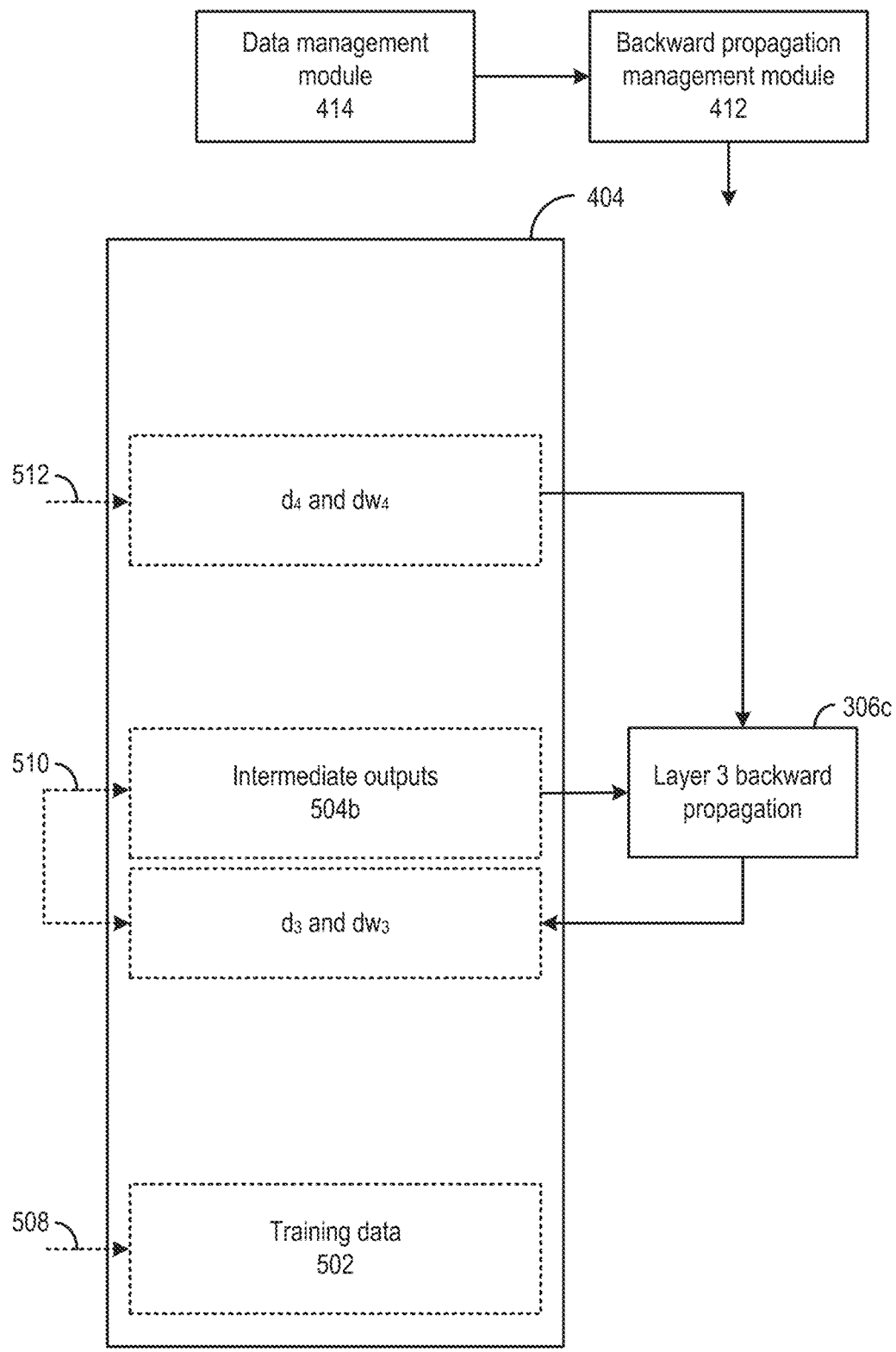

Referring to FIG. 6C, backward propagation management module 412 can then control neural network processor 406 to perform a layer 3 backward propagation operation 306c, which needs data gradients $d_4$ and intermediate outputs 504b from layer 2, both of which are stored in memory 404. Neural network processor 406 can fetch data gradients $d_4$ and intermediate outputs 504b from, respectively, memory addresses 512 and 510 to perform layer 3 backward propagation operation 306c. As data gradients da and intermediate outputs 504b are not used in subsequent operations, data management module 414 can instruct neural network processor 406 to store the outputs of layer 3 backward propagation operation 306c, including data gradients $d_3$ and weight gradients $dw_3$, at memory address 510 to overwrite intermediate outputs 504b (or at memory address 512 to overwrite data gradients $d_4$ and weight gradients $wd_4$). Computations module 416 can also obtain weight gradients $dw_3$ to update the weights of layer 3.

Figure 6D:
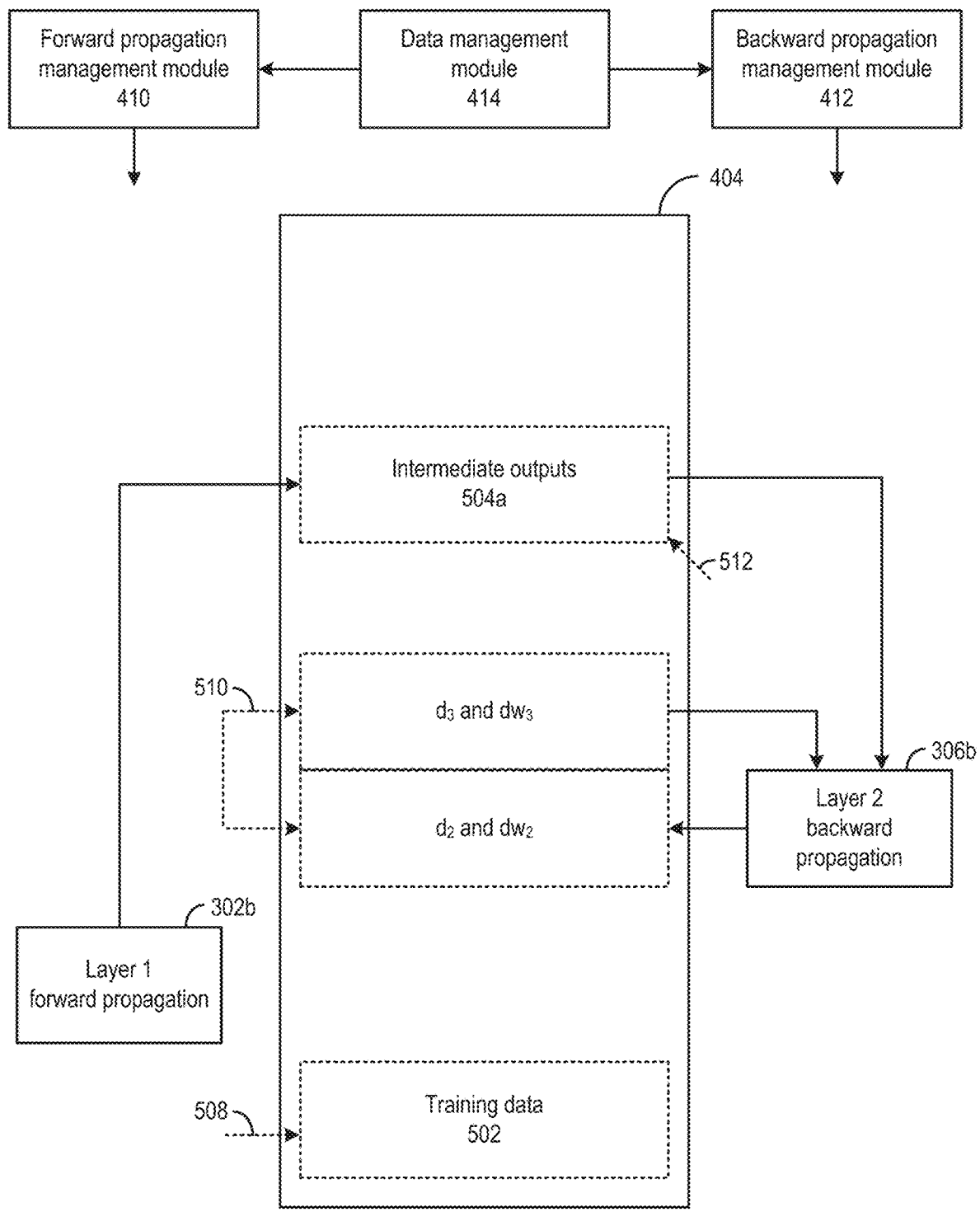

Referring to FIG. 6D, backward propagation management module 412 can then control neural network processor 406 to perform a layer 2 backward propagation operation 306b, which needs data gradients $d_3$ and intermediate outputs 504a from layer 1. But intermediate outputs 504a are not retained after the forward propagation operations complete, as explained above. Data management module 414, via forward propagation management module 410, can control neural network processor 406 to repeat layer 1 forward propagation operation 302a to regenerate intermediate outputs 504a. Neural network processor 406 can obtain training data 502 from memory address 508 to perform layer 1 forward propagation operation 302a, and store intermediate outputs 504a at memory address 512, or at another memory address that can be overwritten (e.g., memory address 602). Neural network processor 406 can then fetch output error gradients d3 from memory address 510 and intermediate outputs 504a from memory address 512 (or 602) to perform layer 1 backward propagation operation 306a. As data gradients $d_3$ are not used by other subsequent processes, data management module 414 can instruct neural network processor 406 to store the outputs of layer 2 backward propagation operation 306b, including data gradients $d_2$ and weight gradients $dw_2$, at memory address 510, to overwrite data gradients $d_3$. Intermediate outputs 504a are also not needed in subsequent operations and can be overwritten later. Computations module 416 can also obtain weight gradients $dw_2$ from memory address 510 to update the weights of layer 2.

Figure 6E:
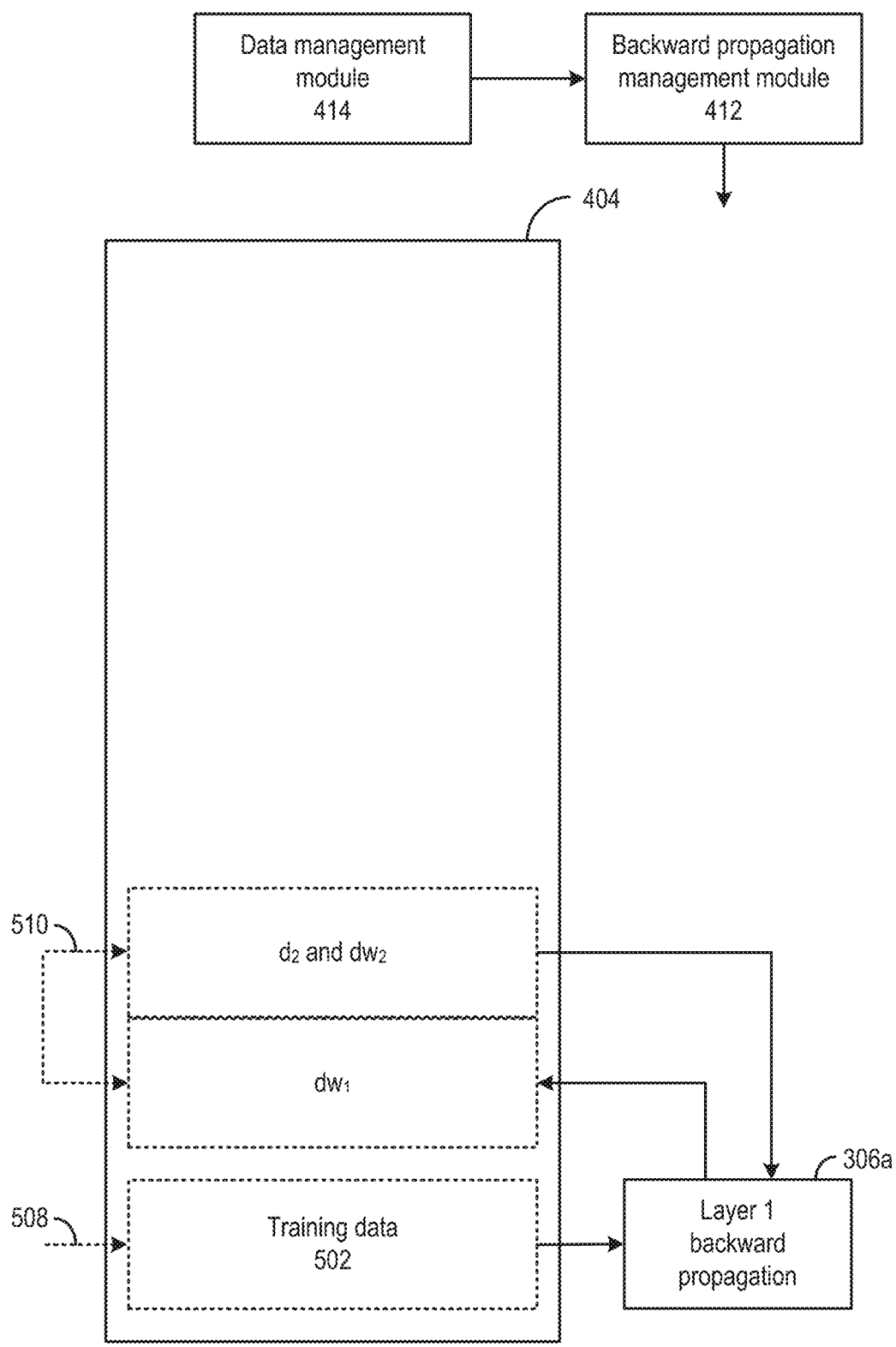

Referring to FIG. 6E, finally backward propagation management module 412 can control neural network processor 406 to perform a layer 1 backward propagation operation 306a, which needs data gradients $d_2$ and training data 502, both of which are stored in memory 404. Neural network processor 406 can fetch data gradients $d_2$ and training data 502 from, respectively, memory addresses 510 and 508 to perform layer 1 backward propagation operation 306a to generate weight gradients $dw_1$ for layer 1, which can be stored in any address that can be overwritten, including memory addresses 510 and 508. Computations module 416 can also obtain weight gradients $dw_1$ from memory 404 to update the weights of layer 1.

In the examples of FIG. 5A-FIG. 6E, data management module 414 can select a subset of the neural network layers to store the intermediate outputs based on a pre-defined pattern, where each neural network layer of the subset is separated by a pre-determined number of neural network layers (one). Data management module 414 can receive the pre-defined pattern as part of a training configuration.

In some examples, data management module 414 can also select the subset of the neural network layers based on various heuristics, such as the topology of the neural network, the size of the memory, the available computation resources of the computing system, etc. For example, based on the topology of the neural network, data management module 414 may determine that the intermediate outputs of a first layer have a smaller data size than the intermediate outputs of a second layer, and determines not to store the smaller intermediate outputs of the first layer which may take a shorter time to regenerate. As another example, data management module 414 may determine that, while the intermediate outputs of the first layer have a smaller data size than the intermediate outputs of a second layer, the first layer has a higher complexity (e.g., requires more complex arithmetic operations, post-processing operations, etc.) and requires more time and/or computation resources to regenerate the intermediate outputs than the second layer. In such a case, data management module 414 may determine not to store the intermediate outputs of the second layer instead.

In some examples, data management module 414 may receive heuristic information about the size of intermediate outputs and the execution time of a forward propagation operation for each layer of a neural network, and select which layer to store the intermediate outputs based on the heuristic information. FIG. 7 illustrates an example of the heuristic information 700 for different layers. The intermediate output data size (e.g., size-0, size-1, etc.) can reflect the topology of a neural network (e.g., a number of nodes in each layer of the neural network), whereas the forward propagation computation time (e.g., time-0, time-1, etc.) for each layer can reflect the topology of the neural network (e.g., the computation operations involved in each layer) as well as the computation resources 402 available from neural network processor 406 to support the forward propagation operation. Given a size of memory 404, data management module 414 can determine different subsets of layers for which the intermediate outputs can fit into memory 404, based on the intermediate output size information from heuristic information 700. Moreover, for each subset, data management module 414 can also compute the time to regenerate the intermediate outputs for the layers not part of the subset. Data management module 414 can then select the subset which requires the minimum time to regenerate the intermediate outputs. With such arrangements, data management module 414 can adapt the selection to different neural network topologies, available computation resources, available memory resources, etc., to optimize the training operation.

Figure 8:
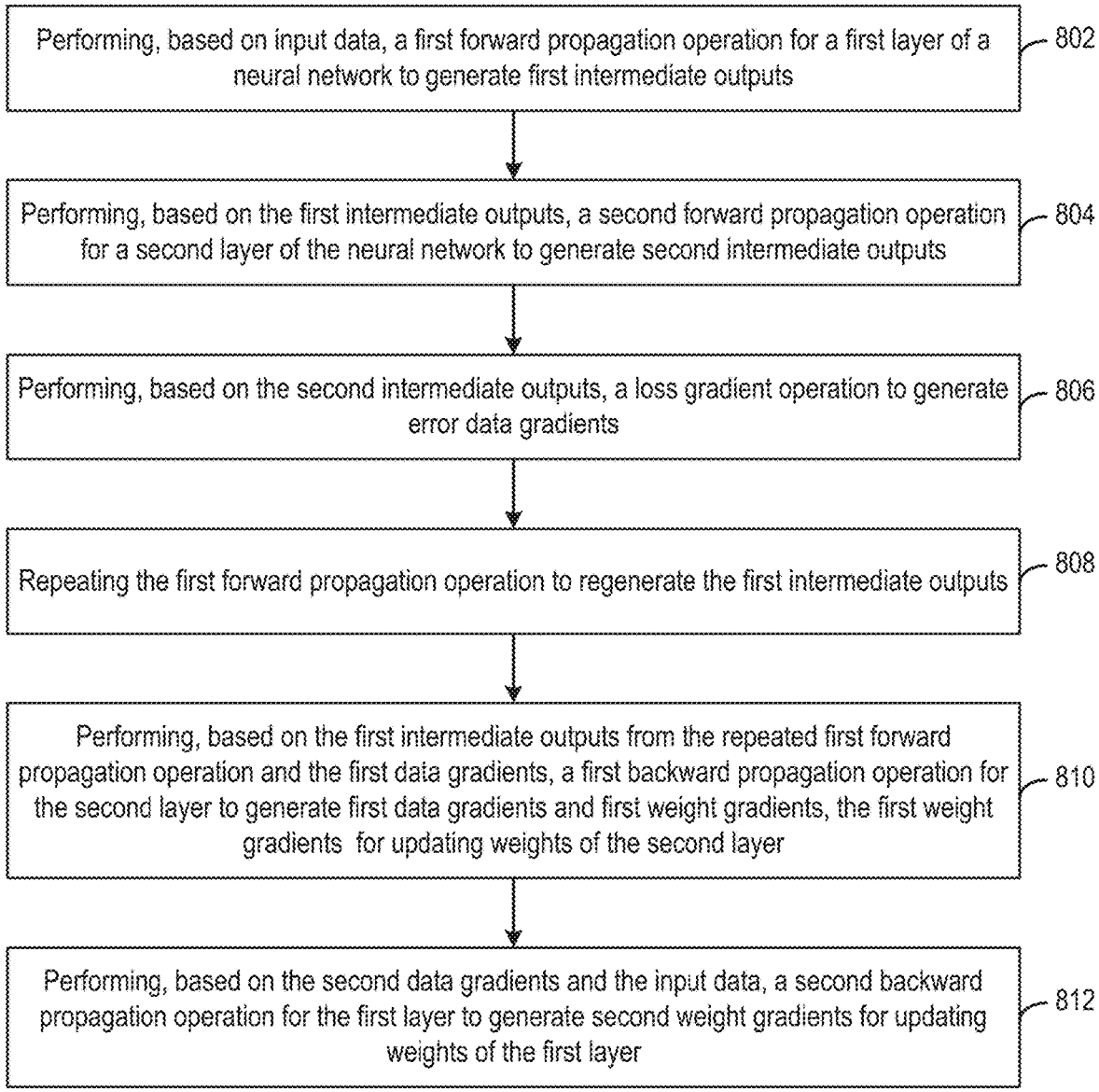
FIG. 8 illustrates an example of a flow chart of a training operation, according to certain aspects of the present disclosure.

FIG. 8 illustrates a flowchart of a method 800 for training a neural network. The neural network, such as a prediction model shown in FIG. 2A, comprises at least a first layer and a second layer. Method 800 can be performed by a neural network processor (e.g., neural network processor 406) in conjunction with a training module (e.g., training module 400) and coupled with a memory (e.g., memory 404). Memory 404 can include an on-chip memory of neural network processor 406 and/or an off-chip memory (e.g., HBM).

In step 802, neural network processor 406 can perform, based on input data, a first forward propagation operation for a first layer of a neural network to generate first intermediate outputs. The first layer can be an input layer (e.g., input layer 207), or an intermediate layer (e.g., intermediate layers 209, 211, etc.). As explained above, forward propagation management module 410 can control computation resources 402 of neural network processor 406 to perform forward propagation operations sequentially for each layer starting from layer 1 and ending at layer n (the highest layer), such as operations 302a-302n of FIG. 3A, and signal the status of forward propagation operation at each layer. As part of the sequential forward propagation operations, forward propagation management module 410 can control neural network processor 406 to perform the first forward propagation operation for the first layer. Data management module 414 can also control neural network processor 406 to fetch the input data to the first propagation operation from memory 404, and to store the first intermediate outputs in memory 404.

In step 804, neural network processor 406 can perform, based on the first intermediate outputs, a second forward propagation operation for the second layer of the neural network to generate second intermediate outputs. Forward propagation management module 410 can control neural network processor 406 to perform the second forward propagation operation for the second layer. Data management module 414 can also control neural network processor 406 to obtain the first intermediate outputs from memory 404 as inputs to the second forward propagation operation.

As explained above, data management module 414 can select a subset of layers for which the intermediate outputs are to be retained in memory 404 at the end of the forward propagation operations and prior to the loss gradient operation, while the intermediate outputs of the rest of the layers are not retained. Such arrangements can reduce the total data size of the intermediate outputs stored in memory 404, which in turn can increase the batch size supported by memory 404. The subset of layers selected to retain the intermediate outputs can be based on a pre-determined pattern (e.g., to store the intermediate outputs for every other layer), based on heuristics (e.g., completion times of forward propagation operations, data sizes of intermediate outputs for each layer, etc.), or based on other suitable criteria, as explained above with respect to FIG. 6A-FIG. 7. As part of step 804, data management module 414 can control neural network processor 406 (via forward propagation management module 410) to overwrite the first intermediate outputs with the second intermediate outputs, based on the determination that the first intermediate outputs are not retained at the end of the forward propagation operations.

In step 806, neural network processor 406 can perform, based on the second intermediate outputs, a loss gradient operation to generate output error gradients. As explained above, a loss gradient operation, such as loss gradient operation 304, can compare the second intermediate output data of the second layer against reference output data to generate the output error gradients. The output error gradients can measure a partial derivative of the output error, represented by the difference between the second intermediate outputs and the reference output data, with respect to each data element of the second intermediate outputs. In some examples, an objective of the training is to minimize the output error. Neural network processor 406 can be controlled by backward propagation management module 412 to perform the loss gradient operation, whereas data management module 414 can control neural network processor 406 (via backward propagation management module 412) to fetch the second intermediate outputs from memory 404. In some examples, a loss gradient operation can be performed by computations module 416 as well.

In step 808, neural network processor 406 can repeat the first forward propagation operation, based on input data from memory 404, to regenerate the first intermediate outputs. The first intermediate outputs are regenerated as inputs to the first backward propagation operation. But as the first intermediate outputs are not stored in memory 404, data management module 414 can control forward propagation management module 410 to repeat the first forward propagation to regenerate the first intermediate outputs and to store the first intermediate outputs in memory 404. As the second intermediate outputs are already consumed by the loss gradient operation, data management module 414 can control neural network processor 406 to overwrite the second intermediate outputs with the first intermediate outputs in memory 404.

In step 810, neural network processor 406 can perform, based on the first intermediate outputs from the repeated first forward propagation operation and the first data gradients, a first backward propagation operation for the second layer to generate first data gradients and first weight gradients, the first weight gradients being for updating weights of the second layer. As explained above, the first backward propagation operation can be associated with the second layer. Backward propagation management module 412 can control neural network processor 406 to perform the first backward propagation operation, while data management module 414 can control neural network processor 406 (via backward propagation management module 412) to fetch the first intermediate outputs from memory 404 and to store the first data gradients and the first weight gradients in memory 404. The first data gradients can be provided as inputs to the subsequent backward propagation operation for the first layer, whereas the first weight gradients can be used to update the weights of the second layer, as explained above in FIG. 3A and FIG. 6B-FIG. 6E. The updating of the weights can be performed by neural network processor 406 and/or by computations module 416.

In step 812, neural network processor 406 can perform, based on the input data and the second data gradients, a second backward propagation operation for the first layer to generate second weight gradients for updating weights of the first layer. Backward propagation management module 412 can control neural network processor 406 to perform the second backward propagation operation, while data management module 414 can control neural network processor 406 (via backward propagation management module 412) to fetch the input data and the first data gradients from memory 404 and to store the second weight gradients in memory 404. In a case where there is another layer preceding the first layer, the second backward propagation operation can also generate second data gradients for the preceding layer. The updating of the weights for the first layer can be performed by neural network processor 406 and/or by computations module 416.

Figure 9:
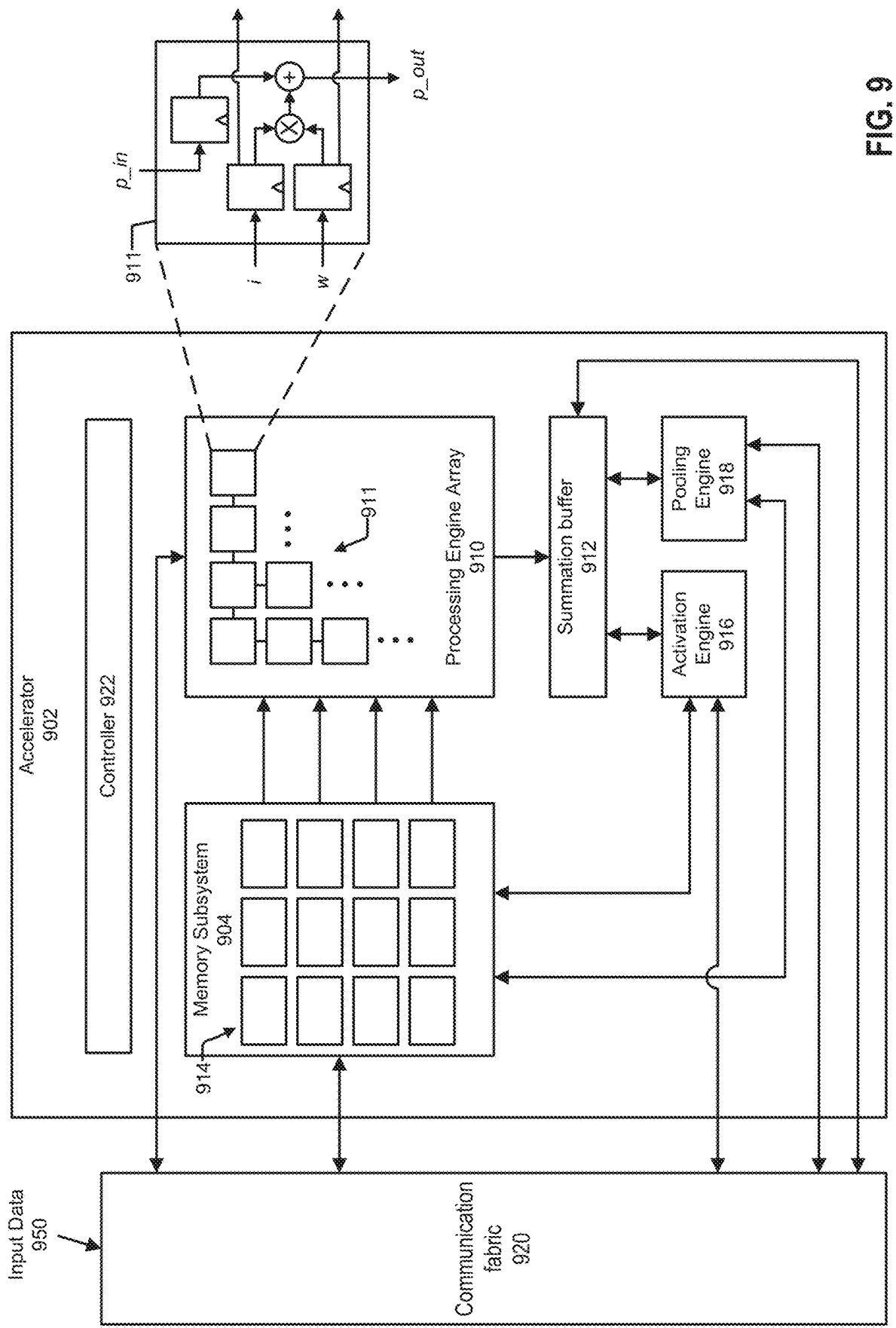
FIG. 9 illustrates an example of an integrated circuit that can support the example training operation of FIGS. 5A-6E.

FIG. 9 is a block diagram illustrating an example of an integrated circuit device that can include neural network processor 406 of FIG. 4 and can be controlled by training module 400 to perform a training operation. The example of FIG. 9 illustrates an accelerator 902. In various examples, the accelerator 902, for a set of input data (e.g., input data 950), can execute computations using a processing engine array 910, an activation engine 916, and/or a pooling engine 918. In some examples, the example accelerator 902 may be an integrated circuit component of a processor, such as a neural network processor. The processor may have other integrated circuit components, including additional accelerator engines.

In various implementations, the memory subsystem 904 can include multiple memory banks 914. In these implementations, each memory bank 914 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 914. For example, each memory bank can be a physically separate memory component that has an address space that is separate from and independent of the address spaces of each other memory bank. In this example, each memory bank may have at least one read channel and may have at least one separate write channel that can be used at the same time. In these examples, the memory subsystem 904 can permit simultaneous access to the read or write channels of multiple memory banks. As another example, the memory subsystem 904 can include arbitration logic such that arbitration between, for example, the outputs of multiple memory banks 914 can result in more than one memory bank's output being used. In these and other examples, though globally managed by the memory subsystem 904, each memory bank can be operated independently of any other.

Having the memory banks 914 be independently accessible can increase the efficiency of the accelerator 902. For example, values can be simultaneously read and provided to each row of the processing engine array 910, so that the entire processing engine array 910 can be in use in one clock cycle. As another example, the memory banks 914 can be read at the same time that results computed by the processing engine array 910 are written to the memory subsystem 904. In contrast, a single memory may be able to service only one read or write at a time. With a single memory, multiple clock cycles can be required, for example, to read input data for each row of the processing engine array 910 before the processing engine array 910 can be started.

In various implementations, the memory subsystem 904 can be configured to simultaneously service multiple clients, including the processing engine array 910, the activation engine 916, the pooling engine 918, and any external clients that access the memory subsystem 904 over a communication fabric 920. In some implementations, being able to service multiple clients can mean that the memory subsystem 904 has at least as many memory banks as there are clients. In some cases, each row of the processing engine array 910 can count as a separate client. In some cases, each column of the processing engine array 910 can output a result, such that each column can count as a separate write client. In some cases, output from the processing engine array 910 can be written into the memory banks 914 that can then subsequently provide input data for the processing engine array 910. As another example, the activation engine 916 and the pooling engine 918 can include multiple execution channels, each of which can be separate memory clients. The memory banks 914 can be implemented, for example, using static random access memory (SRAM).

In various implementations, the memory subsystem 904 can include control logic. The control logic can, for example, keep track of the address spaces of each of the memory banks 914, identify memory banks 914 to read from or write to, and/or move data between the memory banks 914. In some implementations, memory banks 914 can be hardwired to particular clients. For example, a set of memory banks 914 can be hardwired to provide values to the rows of the processing engine array 910, with one memory bank servicing each row. As another example, a set of memory banks can be hard wired to receive values from columns of the processing engine array 910, with one memory bank receiving data for each column.

The processing engine array 910 is the computation matrix of the example accelerator 902. The processing engine array 910 can, for example, execute parallel integration, convolution, correlation, and/or matrix multiplication, among other things. The processing engine array 910 includes multiple processing engines 911, arranged in rows and columns, such that results output by one processing engine 911 can be input directly into another processing engine 911. Processing engines 911 that are not on the outside edges of the processing engine array 910 thus can receive data to operate on from other processing engines 911, rather than from the memory subsystem 904.

In various examples, the processing engine array 910 uses systolic execution, in which data arrives at each processing engine 911 from different directions at regular intervals. In some examples, input data can flow into the processing engine array 910 from the left and weight values can be loaded at the top. In some examples weights and input data can flow from the left and partial sums can flow from top to bottom. In these and other examples, a multiply-and-accumulate operation moves through the processing engine array 910 as a diagonal wave front, with data moving to the right and down across the array. Control signals can be input at the left at the same time as weights, and can flow across and down along with the computation.

In various implementations, the number of columns in the processing engine array 910 determines the computational capacity of the processing engine array 910, and the number of rows determines the required memory bandwidth for achieving maximum utilization of the processing engine array 910. The processing engine array 910 can have, for example, 64 columns and 428 rows, or some other number of columns and rows.

An example of a processing engine 911 is illustrated in FIG. 9 in an inset diagram. As illustrated by this example, a processing engine 911 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 911.

In the illustrated example, an input from above can include a partial sum, p_in, provided either from another processing engine 911 or from a previous round of computation by the processing engine array 910. When starting a computation for a new set of input data, the top row of the processing engine array 910 can receive a fixed value for p_in, such as zero. As illustrated by this example, i and w are multiplied together and the result is summed with p_in to produce a new partial sum, p_out, which can be input into another processing engine 911. Various other implementations of the processing engine 911 are possible.

Outputs from the last row in the processing engine array 910 can be temporarily stored in the results buffer 912. The results can be intermediate results, which can be written to the memory banks 914 to be provided to the processing engine array 910 for additional computation. Alternatively, the results can be final results, which, once written to the memory banks 914, can be read from the memory subsystem 904 over the communication fabric 920, to be output by the system.

In some implementations, the accelerator 902 includes an activation engine 916. In these implementations, the activation engine 916 can combine the results from the processing engine array 910 into one or more output activations. For example, for a convolutional neural network, convolutions from multiple channels can be summed to produce an output activation for a single channel. In other examples, accumulating results from one or more columns in the processing engine array 910 may be needed to produce an output activation for a single node in the neural network. In some examples, activation engine 916 can be bypassed.

In various examples, the activation engine 916 can include multiple separate execution channels. In these examples, the execution channels can correspond to the columns of the processing engine array 910, and can perform an operation on the outputs of a column, the result of which can be stored in the memory subsystem 904. In these examples, the activation engine 916 may be able to perform between 1 and n parallel computations, where n is equal to the number of columns in the processing engine array 910. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 902 can include a pooling engine 918. Pooling is the combining of outputs of the columns of the processing engine array 910. Combining can include, for example, computing a maximum value, a minimum value, an average value, a median value, a summation, a multiplication, or another logical or mathematical combination. In various examples, the pooling engine 918 can include multiple execution channels that can operate on values from corresponding columns of the processing engine array 910. In these examples, the pooling engine 918 may be able to perform between 1 and n parallel computations, where n is equal to the number of columns in the processing engine array 910. In various examples, execution channels of the pooling engine 918 can operate in parallel and/or simultaneously. In some examples, the pooling engine 918 can be bypassed.

Herein, the activation engine 916 and the pooling engine 918 may be referred to collectively as execution engines. The processing engine array 910 is another example of an execution engine. Another example of an execution engine is a Direct Memory Access (DMA) engine, which may be located outside the accelerator 902.

Input data 950 can arrive over the communication fabric 920. The communication fabric 920 can connect the accelerator 902 to other components of a processor, such as a DMA engine that can obtain input data 950 from an Input/Output (I/O) device, a storage drive, or a network interface. The input data 950 can be, for example, one-dimensional data, such as a character string or numerical sequence, or two-dimensional data, such as an array of pixel values for an image or frequency and amplitude values over time for an audio signal. In some examples, the input data 950 can be three-dimensional, as may be the case with, for example, the situational information used by a self-driving car or virtual reality data. In some implementations, the memory subsystem 904 can include a separate buffer for the input data 950. In some implementations, the input data 950 can be stored in the memory banks 914 when the accelerator 902 receives the input data 950.

In some examples, the accelerator 902 can implement a neural network processing engine. In these examples, the accelerator 902, for a set of input data 950, can execute a neural network to perform a task for which the neural network was trained. Executing a neural network on a set of input data can be referred to as inference or performing inference.

The weights for the neural network can be stored in the memory subsystem 904, along with input data 950 on which the neural network will operate. The neural network can also include instructions, which can program the processing engine array 910 to perform various computations on the weights and the input data. The instructions can also be stored in the memory subsystem 904, in the memory banks 914 or in a separate instruction buffer. The processing engine array 910 can output intermediate results, which represent the outputs of individual layers of the neural network. In some cases, the activation engine 916 and/or pooling engine 918 may be enabled for computations called for by certain layers of the neural network. The accelerator 902 can store the intermediate results in the memory subsystem 904 for inputting into the processing engine array 910 to compute results for the next layer of the neural network. The processing engine array 910 can further output final results from a last layer of the neural network. The final results can be stored in the memory subsystem 904 and then be copied out to host processor memory or to another location.

Figure 10:
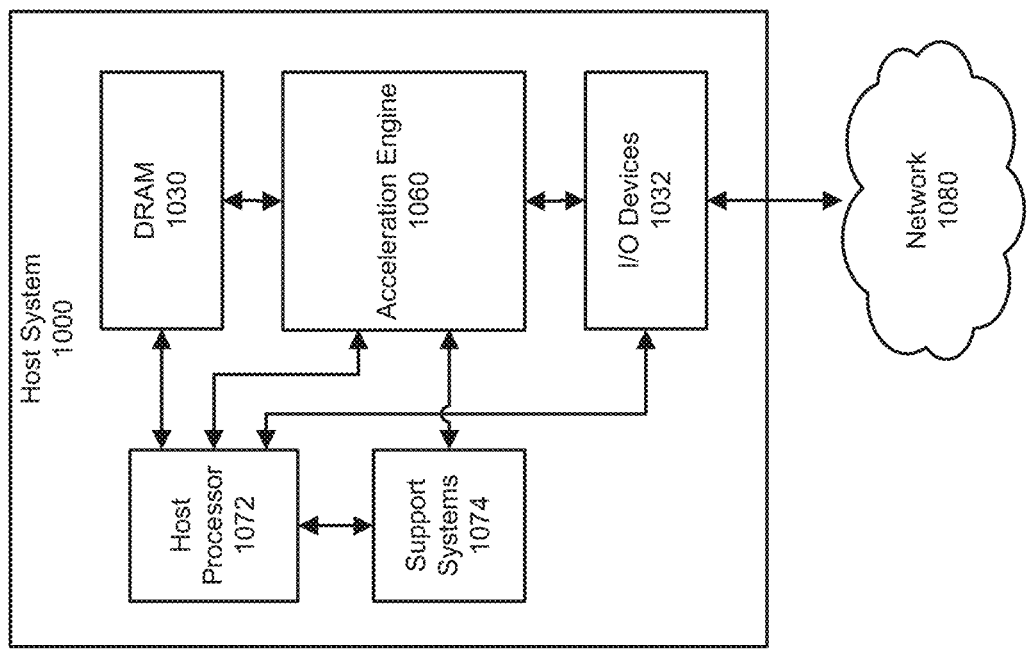
FIG. 10 illustrates an example of a host system that can support the example training operation of FIGS. 5A-6E.

FIG. 10 includes a block diagram that illustrates an example of a host system 1000 in which an acceleration engine 1060 can be used. The acceleration engine 1060 of FIG. 10 is an example of a device that can include one or more accelerators such as is illustrated in FIG. 9. The example host system 1000 of FIG. 10 includes the acceleration engine 1060, a host processor 1072, DRAM 1030 or processor memory, I/O devices 1032, and support systems 1074. In various implementations, the host system 1000 can include other hardware that is not illustrated here.

The host processor 1072 is a general purpose integrated circuit that is capable of executing program instructions. In some examples, the host processor 1072 can include multiple processing cores. A multi-core processor may include multiple processing units within the same processor. In some examples, the host system 1000 can include more than one host processor 1072. In some examples, the host processor 1072 and the acceleration engine 1060 can be one chip, such as one or more integrated circuits within the same package.

In various examples, the host processor 1072 can communicate with other components in the host system 1000 over one or more communication channels. For example, the host system 1000 can include a host processor bus, which the host processor 1072 can use to communicate with the DRAM 1030, for example. As another example, the host system 1000 can include an I/O bus, such as a PCI-based bus, over which the host processor 1072 can communicate with the acceleration engine 1060 and/or the I/O devices 1032, for example. In various examples, the host system 1000 can, alternatively or additionally, include other communication channels or busses, such as serial busses, power management busses, storage device busses, and so on.

In some examples, software programs executing on the host processor 1072 can receive or generate input for processing by the acceleration engine 1060. In some examples, the programs can select an appropriate neural network to execute for a given input. For example, a program may be for language translation, and can select one or more neural networks capable of speech recognition and/or machine translation. In these and other examples, the programs can configure the acceleration engine 1060 with the neural network to execute, and/or can select a neural network processing engine on the acceleration engine 1060 that has previously been configured to execute the desired neural network. In some examples, once the acceleration engine 1060 has started an inference on input data, the host processor 1072 can manage the movement of data (such as weights, instructions, intermediate results, results of conditional layers, and/or final results) into or out of the acceleration engine 1060.

In some examples, a software program that is using the acceleration engine 1060 to conduct an inference can read the result from a conditional layer from the acceleration engine 1060 and/or from a storage location, such as in DRAM 1030. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software. In some examples, a software program can also use acceleration engine 1060 to perform a training operation. The software program can include, for example, training module 400 and execute in host processor 1072.

The DRAM 1030 is memory that is used by the host processor 1072 for storage of program code that the host processor 1072 is in the process of executing, as well as values that are being operated on. In some examples, the data for a neural network (e.g., weight values, instructions, and other data) can be all or partially stored in the DRAM 1030. DRAM is a common term for processor memory, and though DRAM is volatile memory, processor memory can be volatile and/or non-volatile. Though not illustrated here, the host system 1000 can include other volatile and non-volatile memories for other purposes. For example, the host system 1000 can include a Read-Only Memory (ROM) that stores boot code for booting the host system 1000 at power on, and/or Basic Input/Output System (BIOS) code.

Though not illustrated here, the DRAM 1030 can store instructions for various programs, which can be loaded into and be executed by the host processor 1072. For example, the DRAM 1030 can be storing instructions for an operating system, one or more data stores, one or more application programs, one or more drivers, and/or services for implementing the features disclosed herein.

The operating system can manage and orchestrate the overall operation of the host system 1000, such as scheduling tasks, executing applications, and/or controller peripheral devices, among other operations. In some examples, a host system 1000 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1000. For example, some drivers can provide communication between the operating system and peripheral devices or I/O devices 1032. Alternatively or additionally, some drivers may provide communication between application programs and the operating system, and/or application programs and peripheral devices accessible to the host system 1000. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1032 can include hardware for connecting to user input and output devices, such as keyboards, mice, pens, tablets, voice input devices, touch input devices, displays or monitors, speakers, and printers, among other devices. The I/O devices 1032 can also include storage drives and/or network interfaces for connecting to a network 1080. For example, the host system 1000 can use a network interface to communicate with storage devices, user terminals, other computing devices or servers, and/or other networks, among various examples.

In various examples, one or more of the I/O devices 1032 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1000 or may be in an external enclosure. A storage device can be fixed (e.g., attached by screws) or removable (e.g., having a physical release mechanism and possibly a hot-plug mechanism).

Storage devices, the DRAM 1030, and any other memory component in the host system 1000 are examples of computer-readable storage media. Computer-readable storage media are physical mediums that are capable of storing data in a format that can be read by a device such as the host processor 1072. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various implementations, the support systems 1074 can include hardware for coordinating the operations of the acceleration engine 1060. For example, the support systems 1074 can include a microprocessor that coordinates the activities of the acceleration engine 1060, including moving data around on the acceleration engine 1060. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1072. In some examples, the program executed by the microprocessor is stored on the hardware of microprocessor, or on a non-volatile memory chip in the host system 1000. In some examples, the microprocessor and the acceleration engine 1060 can be on a chip, such as one integrated circuit on the same die and in the same package.

In some examples, the support systems 1074 can be responsible for taking instructions from the host processor 1072 when programs executing on the host processor 1072 request the execution of a neural network. For example, the host processor 1072 can provide the support systems 1074 with a set of input data and a task that is to be performed on the set of input data. In this example, the support systems 1074 can identify a neural network that can perform the task, and can program the acceleration engine 1060 to execute the neural network on the set of input data. In some examples, the support systems 1074 only need to select an appropriate neural network processing engine of the neural network processor. In some examples, the support systems 1074 may need to load the data for the neural network onto the acceleration engine 1060 before the acceleration engine 1060 can start executing the neural network. In these and other examples, the support systems 1074 can further receive the output of executing the neural network, and provide the output back to the host processor 1072.

In some examples, the operations of the support systems 1074 can be handled by the host processor 1072. In these examples, the support systems 1074 may not be needed and can be omitted from the host system 1000.

In various examples, the host system 1000 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1000 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An apparatus comprising:
 a memory that stores instructions; and
 a hardware processor configured to execute the instructions to:
  control a neural network processor to perform a loss gradient operation to generate data gradients;
  after the loss gradient operation completes, control the neural network processor to perform a forward propagation operation to regenerate intermediate outputs, the intermediate outputs having been previously generated by the neural network processor;
  control the neural network processor to perform a backward propagation operation based on the data gradients and the intermediate outputs to generate weight gradients;
  receive the weight gradients from the neural network processor; and
  update weights of a neural network based on the weight gradients.

2. The apparatus of claim 1, wherein the forward propagation operation is a first forward propagation operation;
 wherein the intermediate outputs are first intermediate outputs;
 wherein the hardware processor is configured to execute the instructions to, prior to the loss gradient operation:
  control the neural network processor to perform the first forward propagation operation to generate the first intermediate outputs; and
  control the neural network processor to perform, based on the first intermediate outputs, a second forward propagation operation to generate second intermediate outputs.

3. The apparatus of claim 2, wherein the hardware processor is configured to execute the instructions to, prior to the loss gradient operation:
 control the neural network processor not to store the first intermediate outputs and to store the second intermediate outputs after the second propagation operation completes.

4. The apparatus of claim 3, wherein the second intermediate outputs are stored in a second memory after the second propagation operation completes, and wherein the memory is a first memory.

5. The apparatus of claim 2, wherein the hardware processor is configured to execute the instructions to, prior to the loss gradient operation:
 control the neural network processor to overwrite the first intermediate outputs with the second intermediate outputs in a second memory after the second propagation operation completes, wherein the memory is a first memory.

6. The apparatus of claim 2, wherein the forward propagation operation is performed based on input data that is received from another layer of the neural network.

7. The apparatus of claim 2, wherein the first forward propagation operation is for a first layer of the neural network, and wherein the second forward propagation operation is for a second layer of the neural network.

8. A non-transitory computer readable medium storing instructions that, when executed by a processor, cause the processor to:
 control a neural network processor to perform a loss gradient operation to generate data gradients;
 after the loss gradient operation completes, control the neural network processor to perform a forward propagation operation to regenerate intermediate outputs, the intermediate outputs having been previously generated by the neural network processor;
 control the neural network processor to perform a backward propagation operation based on the data gradients and the intermediate outputs to generate weight gradients;
 receive the weight gradients from the neural network processor; and
 update weights of a neural network based on the weight gradients.

9. The non-transitory computer readable medium of claim 8, wherein the forward propagation operation is a first forward propagation operation;
 wherein the intermediate outputs are first intermediate outputs;
 wherein the processor is caused to, prior to the loss gradient operation:
  control the neural network processor to perform the first forward propagation operation to generate the first intermediate outputs; and
  control the neural network processor to perform, based on the first intermediate outputs, a second forward propagation operation to generate second intermediate outputs.

10. The non-transitory computer readable medium of claim 9, wherein the processor is caused to, prior to the loss gradient operation:
 control the neural network processor not to store the first intermediate outputs and to store the second intermediate outputs after the second propagation operation completes.

11. The non-transitory computer readable medium of claim 10, wherein the second intermediate outputs are stored in a memory after the second propagation operation completes.

12. The non-transitory computer readable medium of claim 9, wherein the processor is caused to, prior to the loss gradient operation:
 control the neural network processor to overwrite the first intermediate outputs with the second intermediate outputs in a memory after the second propagation operation completes.

13. The non-transitory computer readable medium of claim 9, wherein the forward propagation operation is performed based on input data that is received from another layer of the neural network.

14. The non-transitory computer readable medium of claim 9, wherein the first forward propagation operation is for a first layer of the neural network, and wherein the second forward propagation operation is for a second layer of the neural network.

15. A method comprising:
 controlling a neural network processor to perform a loss gradient operation to generate data gradients;
 after the loss gradient operation completes, controlling the neural network processor to perform a forward propagation operation to regenerate intermediate outputs, the intermediate outputs having been previously generated by the neural network processor;
 controlling the neural network processor to perform a backward propagation operation based on the data gradients and the intermediate outputs to generate weight gradients;
 receiving the weight gradients from the neural network processor; and
 updating weights of a neural network based on the weight gradients.

16. The method of claim 15, wherein the forward propagation operation is a first forward propagation operation;
wherein the intermediate outputs are first intermediate outputs;
wherein the method further comprises, prior to the loss gradient operation:
controlling the neural network processor to perform the first forward propagation operation to generate the first intermediate outputs; and
controlling the neural network processor to perform, based on the first intermediate outputs, a second forward propagation operation to generate second intermediate outputs.

17. The method of claim 16, further comprising, prior to the loss gradient operation:
controlling the neural network processor not to store the first intermediate outputs and to store the second intermediate outputs after the second propagation operation completes.

18. The method of claim 17, wherein the second intermediate outputs are stored in a memory after the second propagation operation completes.

19. The method of claim 16, further comprising, prior to the loss gradient operation:
controlling the neural network processor to overwrite the first intermediate outputs with the second intermediate outputs in a memory after the second propagation operation completes.

20. The method of claim 16, wherein the forward propagation operation is performed based on input data that is received from another layer of the neural network.

* * * * *